(12) United States Patent
Teichrob et al.

(10) Patent No.: US 10,336,168 B2
(45) Date of Patent: Jul. 2, 2019

(54) APPARATUS FOR COVERING A CONTAINER LOAD

(71) Applicant: TY-CROP MANUFACTURING LTD., Rosedale (CA)

(72) Inventors: Gary Wayne Teichrob, Rosedale (CA); Patrick Scott Mason, Cultus Lake (CA); Alan Arthur Martens, Chilliwack (CA); Kevin Brent Thiessen, Rosedale (CA); James Ryan Brezden, Lindell Beach (CA); Robert Douglas Younie, Chilliwack (CA); Dennis Keith Ho, Abbotsford (CA); Brent Douglas Van Kleeck, Chilliwack (CA); Kevin James Standeven, Chilliwack (CA)

(73) Assignee: TY-CROP MANUFACTURING LTD., Rosedale (CA)

( * ) Notice: Subject to any disclaimer, the term of this patent is extended or adjusted under 35 U.S.C. 154(b) by 0 days.

(21) Appl. No.: 15/705,222

(22) Filed: Sep. 14, 2017

(65) Prior Publication Data
US 2019/0077236 A1    Mar. 14, 2019

(51) Int. Cl.
*B60J 11/00* (2006.01)
*B60J 7/08* (2006.01)
*B65D 88/12* (2006.01)

(52) U.S. Cl.
CPC ............ *B60J 7/085* (2013.01); *B65D 88/125* (2013.01)

(58) Field of Classification Search
CPC ........ B60S 1/34; B60S 1/3481; B60S 1/3459; H01L 2924/0002; G07B 17/00508;
(Continued)

(56) References Cited

U.S. PATENT DOCUMENTS 4,212,492 A * 7/1980 Johnsen ................... B60J 7/085
296/98
4,302,043 A * 11/1981 Dimmer ................... B60J 7/085
135/115
(Continued)

FOREIGN PATENT DOCUMENTS

CA    2350179    12/2001
CA    2428891    11/2004
(Continued)

OTHER PUBLICATIONS

Crane.DK—Article on transport & Logistics May 27, 2016; New Automatic Sheeting System for Transport and Agriculture Presented at Vestfyn Tractor, published May 27, 2016, p. 1.
(Continued)

*Primary Examiner* — Kiran B Patel
(74) *Attorney, Agent, or Firm* — Wiley Rein LLP

(57) ABSTRACT

An apparatus for covering an open top of a transportation trailer container, such as a chip train carrying wood chips, is provided. A flexible cover (e.g., tarp) is deployed and retracted using a roller moved overtop of the container using pivotable arms. A recessed region houses the base of the arm and associated components. A secondary cover covers the recessed region and is biased toward a cover closed position. An actuating surface associated with the arm pushes the secondary cover to a cover open position. Other features include inwardly angled container sides, a foam sealing member integral with the flexible cover, the secondary cover closing when the flexible cover is both fully opened and fully closed, channels between the recessed region and the container, narrow and/or sloped surfaces, and a retaining hook for capturing a roller connected to the arm.

18 Claims, 11 Drawing Sheets

(58) Field of Classification Search
CPC . A61B 17/06133; B65B 43/60; A61F 5/3753; A61M 2005/3215; A61M 5/3213
USPC .................. 296/98, 100.16, 100.18
See application file for complete search history.

(56) References Cited

U.S. PATENT DOCUMENTS

| | | | |
|---|---|---|---|
| 4,380,350 A * | 4/1983 | Block | B60J 7/085 296/98 |
| RE31,746 E * | 11/1984 | Dimmer | B60J 7/085 135/87 |
| 4,484,777 A * | 11/1984 | Michel | B60J 7/085 135/88.09 |
| 4,505,512 A * | 3/1985 | Schmeichel | B60J 7/085 135/119 |
| 4,518,193 A * | 5/1985 | Heider | B60J 7/085 296/98 |
| 4,673,208 A * | 6/1987 | Tsukamoto | B60J 7/085 160/243 |
| 4,691,957 A * | 9/1987 | Ellingson | B60J 7/085 135/903 |
| 5,002,328 A * | 3/1991 | Michel | B60J 7/085 296/98 |
| 5,180,203 A * | 1/1993 | Goudy | B60J 7/085 296/100.15 |
| 5,186,231 A * | 2/1993 | Lewis | B60J 7/068 160/264 |
| 5,211,441 A | 5/1993 | Barkus et al. | |
| 5,303,972 A * | 4/1994 | Heider | B60J 7/085 160/310 |
| 5,429,403 A * | 7/1995 | Brasher | B60J 7/085 296/10 |
| 5,482,347 A | 1/1996 | Clarys et al. | |
| 5,573,365 A * | 11/1996 | Michalski | B60J 7/085 414/416.09 |
| 5,697,663 A | 12/1997 | Chenowth | |
| 5,765,901 A * | 6/1998 | Wilkens | B60J 7/085 296/100.16 |
| 5,829,819 A | 11/1998 | Searfoss | |
| 5,882,062 A | 3/1999 | Chenowth | |
| 5,887,937 A | 3/1999 | Searfoss | |
| 5,924,758 A | 7/1999 | Dimmer et al. | |
| 5,944,374 A | 8/1999 | Searfoss | |
| 6,142,553 A * | 11/2000 | Bodecker | B60J 7/085 135/903 |
| 6,142,554 A | 11/2000 | Carroll et al. | |
| 6,199,935 B1 * | 3/2001 | Waltz | B60J 7/085 296/100.14 |
| 6,206,449 B1 | 3/2001 | Searfoss | |
| 6,457,622 B2 | 10/2002 | Henning | |
| 6,481,779 B1 | 11/2002 | Gothier | |
| 6,513,856 B1 | 2/2003 | Swanson et al. | |
| 6,595,594 B2 | 7/2003 | Royer | |
| 6,715,817 B2 | 4/2004 | Nolan et al. | |
| 6,779,828 B1 * | 8/2004 | Poyntz | B60J 7/085 296/100.11 |
| 6,783,168 B2 | 8/2004 | Searfoss | |
| 6,857,682 B2 * | 2/2005 | Eggers | B60J 7/085 296/98 |
| 6,942,274 B2 | 9/2005 | Henning | |
| 6,981,734 B2 | 1/2006 | Martin | |
| 7,032,950 B2 | 4/2006 | Eggers et al. | |
| 7,188,887 B1 * | 3/2007 | Schmeichel | B60J 7/085 296/100.14 |
| 7,246,838 B2 | 7/2007 | Searfoss | |
| 7,275,780 B2 * | 10/2007 | Boyd | B60J 7/085 296/100.01 |
| 7,513,561 B2 | 4/2009 | Royer | |
| 7,594,687 B2 | 9/2009 | Searfoss | |
| 7,726,720 B2 | 6/2010 | Searfoss | |
| 7,841,642 B2 | 11/2010 | Schaefer | |
| 7,866,725 B1 | 1/2011 | Searfoss et al. | |
| 7,967,364 B1 | 6/2011 | Kartes | |
| 7,980,619 B1 | 7/2011 | Girardin | |
| 8,056,955 B1 * | 11/2011 | Schmeichel | B60J 7/085 296/100.14 |
| 8,172,301 B2 | 5/2012 | Searfoss | |
| 8,172,477 B2 | 5/2012 | Damsi | |
| 8,177,284 B1 | 5/2012 | Royer | |
| 8,226,150 B1 * | 7/2012 | Schmeichel | B60P 7/04 296/100.15 |
| 8,235,447 B2 | 8/2012 | Damsi | |
| 8,272,676 B2 | 9/2012 | Bremer | |
| 8,322,967 B2 | 12/2012 | Owens et al. | |
| 8,360,502 B2 | 1/2013 | Kartes et al. | |
| 8,424,951 B1 | 4/2013 | Martin | |
| 8,465,080 B2 | 6/2013 | Searfoss | |
| 8,496,283 B1 * | 7/2013 | Schmeichel | B60J 7/085 296/100.16 |
| 8,534,742 B2 | 9/2013 | Schmeichel et al. | |
| 8,666,595 B2 | 3/2014 | Kartes | |
| 8,690,223 B2 | 4/2014 | Barley | |
| 8,857,885 B2 | 10/2014 | Schmeichel et al. | |
| 8,910,996 B2 | 12/2014 | Bremer | |
| 8,931,823 B2 | 1/2015 | Bremer et al. | |
| 8,985,669 B2 | 3/2015 | Schmeichel | |
| 9,039,065 B2 | 5/2015 | Schmeichel | |
| 9,088,311 B2 | 7/2015 | Knight et al. | |
| 9,136,694 B2 * | 9/2015 | Chenowth | H02H 7/0855 |
| 9,150,086 B1 | 10/2015 | Royer | |
| 9,254,776 B2 | 2/2016 | Schmeichel | |
| 9,561,747 B2 * | 2/2017 | Royer | B65D 88/125 |
| 9,637,040 B1 * | 5/2017 | Berg | B60J 11/02 |
| 9,669,752 B2 * | 6/2017 | Bielfelt | B60J 7/085 |
| 10,086,682 B2 * | 10/2018 | Schmeichel | B60J 7/085 |
| 10,131,214 B2 * | 11/2018 | Bremer | B60J 7/085 |
| 10,155,435 B2 * | 12/2018 | Searfoss | B60J 7/085 |
| 10,160,297 B2 * | 12/2018 | Poyntz | B60J 7/067 |
| 2002/0021018 A1 * | 2/2002 | Royer | B60J 7/085 296/98 |
| 2003/0052505 A1 * | 3/2003 | Searfoss | B60J 7/085 296/98 |
| 2003/0052506 A1 | 3/2003 | Royer | |
| 2003/0090124 A1 * | 5/2003 | Nolan | B60J 7/085 296/98 |
| 2003/0151271 A1 * | 8/2003 | Leischner | B25B 13/48 296/98 |
| 2004/0000798 A1 | 1/2004 | Royer | |
| 2005/0088007 A1 | 4/2005 | Royer | |
| 2008/0116709 A1 | 5/2008 | Royer | |
| 2008/0217952 A1 * | 9/2008 | Royer | B60J 7/085 296/98 |
| 2008/0290068 A1 | 11/2008 | Royer | |
| 2009/0179452 A1 | 7/2009 | Searfoss | |
| 2010/0032978 A1 * | 2/2010 | Miller | B60J 7/085 296/98 |
| 2010/0219656 A1 * | 9/2010 | Chenowth | B60J 7/068 296/98 |
| 2010/0230993 A1 * | 9/2010 | Bremer | B60J 7/085 296/98 |
| 2010/0230994 A1 | 9/2010 | Royer | |
| 2010/0283285 A1 * | 11/2010 | Cramaro | B60J 7/085 296/98 |
| 2011/0091271 A1 | 4/2011 | Damsi | |
| 2011/0187148 A1 | 8/2011 | Damsi | |
| 2011/0203865 A1 | 8/2011 | Knight et al. | |
| 2011/0221233 A1 | 9/2011 | Damsi | |
| 2011/0254310 A1 | 10/2011 | Royer | |
| 2011/0265369 A1 | 11/2011 | Cink | |
| 2012/0001449 A1 | 1/2012 | Kartes et al. | |
| 2012/0080968 A1 | 4/2012 | Knight et al. | |
| 2012/0181812 A1 | 7/2012 | Searfoss | |
| 2012/0235440 A1 | 9/2012 | Searfoss | |
| 2013/0204461 A1 | 8/2013 | Kartes | |
| 2013/0234466 A1 * | 9/2013 | Schmeichel | B60J 7/085 296/100.14 |
| 2013/0249236 A1 * | 9/2013 | Smith | B60J 7/085 296/98 |
| 2013/0313855 A1 * | 11/2013 | Schmeichel | B60J 7/085 296/98 |

(56) References Cited

U.S. PATENT DOCUMENTS

| | | | |
|---|---|---|---|
| 2014/0203589 A1 | 7/2014 | Bremer | |
| 2015/0306943 A1 | 10/2015 | Royer | |
| 2018/0319258 A1* | 11/2018 | Searfoss | B60J 7/085 |

FOREIGN PATENT DOCUMENTS

| | | |
|---|---|---|
| CA | 2568462 A1 | 5/2008 |
| CA | 2580899 | 9/2008 |
| CA | 2707369 | 7/2009 |
| CA | 2753738 | 4/2012 |
| CA | 2764488 | 7/2012 |
| CA | 2589645 | 11/2012 |
| CA | 2743081 | 9/2013 |
| CA | 2764067 | 11/2013 |
| CA | 2730990 | 4/2014 |
| CA | 2696457 | 6/2015 |
| CA | 2805309 | 11/2015 |
| CA | 2721461 | 2/2017 |
| CA | 2754505 | 4/2018 |
| EP | 2505399 A3 | 10/2012 |
| WO | 98/24656 | 6/1998 |

OTHER PUBLICATIONS

Kapellsystem https://www.youtube.com/watch?v=kKBE-3D6OrY, published Apr. 8, 2014, pp. 1-3.

Reisch Hydraulisches Verdeck https://www.youtube.com/watch?v=pzZ6fvEYall, published Dec. 5, 2011, pp. 1-3.

Ecotop automatic hydraulic tarp solution/hydraulic tarp solution, published Dec. 8, 2015, https://www.youtube.com/watch?v=ZtCvYoz1rYw, pp. 1-3.

https://www.facebook.com/Kapellsystem-Nya-i-%C3%96rebro-AB-400165496740992/photos_stream, pp. 1-5.

https://www.linkedin.com/company/industridraperier-ab?trk=extra_biz_viewers_viewed, Mechanical or Industrial Engineering, pp. 1-3.

Kapellsystem Orebro & Svedala . . . , published, Jul. 3, 2013, https://www.facebook.com/400165496740992/photos/pb.400165496740992.-2207520000.1461797352./465071893583685/?type=3&theater, p. 1.

http://www.ecotop.dk/da11, A Solution for Those Hauliers Who Want to Go a Little Further—On the Literer, p. 1.

https://www.facebook.com/ecotop.jensen/photos/pcb.1096267037111508/1096265087111703/?type=3&theater, Ecotop Danmark—Ecotop Danmark added a new photo, Feb. 26, 2016, p. 1.

http://www.agricover.com/rolltarps/ezloc/, Agri-Cover, Semi Trailer Tarps/Farm Truck Roll Tarp System/EZ-LOC, pp. 1-2.

http://www.agricover.com/rolltarps/roltecelectric/, Agri-Cover, Electric Tarp Conversion System/Eectric Motor Kit/ROLTEC, pp. 1-2.

https://www.youtube.com/watch?v=34nrq8pyYFs, ROLTEC Electric Tarp Conversion Features and Benefits, pp. 1-3.

http://www.agricover.com/rolltarps/autolock/, Western Trailer with AUTOLOCK Electric Tarp—You Tube, pp. 1-3.

https://www.youtube.com/watch?v=oQCkdJnUxio, Agri-Cover, Electric Tarps/Electric Roll Tarp System/Autolock, pp. 1-2.

https://www.youtube.com/watch?v=oQCkdJnUxio, 42 Autolock Electric Tarp: See It in Action on a Timple Grain Trailer—You Tube, published Jun. 12, 2014, pp. 1-3.

6 http://www.rollrite.com/products/transfer-chip-trailers, Roll-Rite STS Series/Trailer Tarp System/Transfer and Chip Trailers, pp. 1-4.

"Roll-Rite®STS Series Lock Down Trailer Tarp System with MultiFlex™", https://www.youtube.com/watch? v=JjZCWyq2KSQ, published on Feb. 19, 2015, pp. 1-3.

Roll-Rites® STS Series with Rite-Lock™ and MultiFlex™ Rear Arm Technology, pp. 1-2; https://vimeo.com/124448758.

Design and Manufacture of Tarp Systems and AG.Accessories, pp. 1-2, http://www.michels.ca/product/category/grain_body_tarp_systems.html.

"Michels's Side-Roll Grain Tarp Systems, Select & Maximizer—For All Types of Grain Bodies", pp. 1-2, http://www.michels.ca/ckfinder/userfiles/files/SR-Select%20Maximizer%20Brochure.pdf.

Shur-Coe® has what you need from roll tarps, traps, and a whole line of electrics, pp. 1-2http://www.shurco.com/agriculture/products/grain-trailers/4500-series-hd-for-grain-trailers.

Aero—Side-to-Side Roll Tarp Systems/Aero Industries Roll Tarps, http://www.aeroindustries.com/products/roll-tarps/ #Photos, p. 1.

Aero Industries: Kwik Lock—Grain, (42) Aero industries: Kwik Lock—Grain—YouTube, published Mar. 21, 2012, pp. 1-3, http://www.youtube.com/watch?v=emRPdp_gJvQ.

Power Lock™ Electric System—Kwik-Lock Manual System, pp. 1-3, http://www.aeroindustries.com/products/powerlock-kwik-lock-grain/.

The Lid 2 Hydraulic Flip Tarp/Aero Industries, http://www.aeroindustries.com/products/the-lid-2/, p. 1.

Sidekick 2 Dump Tarp System/Aero Industries, http://www.aeroindustries.com/products/sidekick-2/, p. 1.

42 Aero Industries: Kwik Lock—Grain—YouTube, published Mar. 21, 2012, pp. 1-3, https://www.youtube.com/watch?v=emRPdp_gJvQ.

(42) Kraker Trailers—Safe Roof—YouTube, published on Aug. 28, 2015, pp. 1-3, https://www.youtube.com/watch?v=zrZ-zN3D1-zc.

"Opening the roof tarpaulin has never been as quick and easy—Kraker's SafeRoof 2.0 successful in practice", News and product development > Opening the roof tarpaulin has never been as quick and easy. http://www.krakertrailers.eu/newsandproductdevelopment/?id=732.

Semi-Automatic, Tarping Systems, Truck Tarp System—Pulltarps, pp. 1-6, http://www.pulltarps.com/pull-tarp-spring-loaded-truck-tarp-system.htm.

(42) Fliptop afdeksysteem demo Film Wielton NW33 trailer—YouTube, Published on Mar. 26, 2012, pp. 1-3, https://www.youtube.com/watch?v=U5yVGV4Mc2k.

Fliptop Afdeksystemen/Cup Engineering, pp. 1-4, http://www.cupengineering.nl/pages/sub/38224/Fliptop_.html.

(42) Hyva AO kipper met Multi-kap—KWS—You Tube, Published on Nov. 20, 2012, pp. 1-3, https: www.youtube.com/watch?vr=gfs8bD-nbSM.

We move your world/Hyva—Wir bewegen Ihre Welt, pp. 1-5, http://www.hyva.corn/de/ge/multikap-ii--abdecksystem.htm.

Dawbarn—Commercial vehicle sheeting systems—Dawbarn & Sons Limited, Sheeting Systems The Fast and Safe Method of Covering Vehicles, pp. 1-2, http://www.dawbarn-evertaut.com/.

Mountain Tarp, Products, http://mountaintarp.com/products/3, p. 1.

https://www.youtube.com/watch?v=e2Vu_UpQ_t4, pp. 1-2.

Air Pipe, p. 1, http://www.airpipe.at/en/products/revoplan.html#video.

USTarp—Complete Tarping Systems, Dump Trailer—Best Product Announcementt—Bulletproof Slim Tarp Motor, pp. 1-7, http://www.ustarp.com/#!side-dump-system/c6tk.

(42) Automatisch dekzell DEROO Constructie—YouTube, pp. 1-3, http://www.youtube.com/watch?v=MVhWhggktTw.

Automatic cover system, pp. 1-2, http://www.derooconstructie.be/nl/productoverzicht/automatisch-afdeksysteem/.

"(42) Reisch Hydraulisches Verdek—You Tube", pp. 1-3, Published on Dec. 5, 2011, https://www.youtube.com/watch?v=pzZ6NEYall.

"Hydraulic Rollover Sheet—YouTube", Published on Nov. 9, 2015, pp. 1-3.

"Moving floor trailer with side doors arid liftable top—YouTube", Published on Feb. 13, 2014,pp. 1-3.

"Fruehauf lightweight insulated smooth-sider rigid bodies—YouTube", 1 page.

"(42) Joskin—New Cover—YouTube", Published on Jun. 27, 2012, pp. 1-3.

"(42) SRT-2(R) Spool Roll Tarp Install: #7 Wrapping Cable, Mounting Ratchets and Setting Tension—YouTube", Published on Nov. 25, 2008, pp. 1-3.

"Electric Pull Tarp System Working—YouTube", Grant Whisker, Published on May 15, 2012, pp. 1-3.

"Truck Tarp—Ultimate Aluminum Pulltarp System—YouTube", Published on Apr. 28, 2008, pp. 1-3.

"Chip trucks/trailers, etc. / Heavy Equipment Forums", pp. 1-9.

"(42) Elite Transport—YouTube", pp. 1-2.

"Alloy Trailer—Photo Gallery", pp. 1-2.

(56) References Cited

OTHER PUBLICATIONS

"News—Quick Draw Tarpaulin Systems—quick/draw news/system/month/trucking/truck/trailer", pp. 1-10.
"Features of the Verduyn Tarps Retractable Tarp Systems", Eagle Tarp Systems, pp. 1-6.
"Revolutionary Tarp System", Aero Industries/Tarp Systems & Trailer Accessories, pp. 1-4.
"Quick Draw Tarpaulin Systems", Distributed by Michel's Industries, Ltd. pp. 1-3.
"(42) Tarpsavercords—YouTube" Rhino Decals, Published on Mar. 18, 2010, pp. 1-3.
"Side Kick 2 Complete Assembly", Michel's Industries, pp. 1-13.
"Deloupe possom belly tipper semi-trailer", deloupe—Semi-Trailer Manufacturer, pp. 1-2.
Cramaro Tarps Side Roll Systems—Cramaro Tarps—Side Roll Systems, pp. 1-2, http://www.cramarotarps.com/cramaro-tarps-products/roll-systems/side-roll.
(42) Agri Traders Hopper Bottom Grain Trailer Electric Tarp opener demo—YouTube, Published on May 3, 2011, pp. 1-3, https://www.youtube.com/watch?v=yHLsYUs53lg.
New: Powersheet, pp. 1-4, http://www.knapen-trailers.eu/nieuws/new-powersheet.
(42) VBK Covering Tarp System Powered by Roll-Rite®—European Applications 2, Published on Dec. 17, 2015, pp. 1-3, https://www.youtube.com/watch?v=fsOErVtRaT.
"(42) Reisch Hydraulisches Verdek—You Tube", pp. 1-3, Published on Dec. 5, 2011. https://www.youtube.com/watch?v=pzZ6fvEYall.
"(42) Fuhrmann Fahrzeuge: Hydraulische Plane—YouTube", Published on Jul. 17, 2012, pp. 1-3, https://www.youtube.com/watch?v=649g-NUiwa0.
"Timpte/Thunder Power Tarp 6000XR Series", pp. 1-3, https://store.timpte.com/product?object=9905.
"Power Pro Tarping System", Dump Truck Tarping Systems, p. 1, http://www.powerprotarpingsystems.net/index.html.
"Drakkar—Cramaro cover", (42) Drakkar—Cramaro cover—You Tube, Published on Oct. 21, 2014, https://www.youtube.com/watch?v=YggTa2SPHao.
"Moving floor trailer with side doors and liftable top—YouTube". Published on Feb. 13, 2014, pp. 1-3.
1"Fruehauf lightweight insulated smooth-sider rigid bodies—YouTube", 1 page.

\* cited by examiner

APPARATUS FOR COVERING A CONTAINER LOAD

FIELD OF THE INVENTION

The present invention pertains to the field of transportation and in particular to an apparatus for covering a container load such as bulk materials in a trailer.

BACKGROUND

Wood chips of varying sizes are hauled using road trailers. One version of these road trailers, known as chip trains, includes two trailers hauled behind a tractor unit; a lead trailer (nearest the tractor) and a pup trailer. To maximize the hauled load, it is desirable for chip trains to be as lightweight and as large as possible. This can be achieved in part by designing the trailers to meet the maximum allowable road limits for width, height, and length. Use of lightweight construction material, such as aluminum, is also possible. When loaded, the wood chips often heap higher than the height of the trailer, an allowable method to fit additional chips in many jurisdictions.

The tops of the chip trailers are often open to facilitate loading. Loading is typically done via a front-end loader or by driving under a hopper filled with chips. To unload the chips, the entire chip train and tractor unit can be driven onto a hydraulic tipper. This tipper then raises the chip train and tractor to a steep incline. The front and rear of the pup trailer, and the rear of the lead trailer, are composed of doors that swing open. These doors are unlatched when on the tipper, and the chips flow through both trailers into a pit below the tipper.

Loads should be retained when driving and chips easily blow out the top of the trailer. One common approach is to have a tarp manually drawn across the top of each trailer before transporting chips. This is accomplished by climbing a ladder to a small platform between the trailers. Manual tarping is inherently dangerous, as the operator stands on a small platform approximately 3 meters off the ground in possibly difficult environmental conditions while attempting to draw a tarp across a heaped load. Injuries, often serious, can occur. It also takes a significant amount of time to accomplish the manual tarping and untarping of each trailer.

Due to the size and weight constraints of chip trains, the large doors, and the nature of wood chips, mechanically assisted tarping solutions for this application are challenging, and existing solutions are not fully satisfactory.

Therefore there is a need for an apparatus for covering a container load, such as woodchips of a chip train, or other bulk materials, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide an apparatus for covering a container load. The container may be part of a chip train carrying wood chips, or a container carrying other bulk materials, and the cover may be a flexible cover such as a tarpaulin (tarp). The apparatus can automatically cover the load, thereby reducing labour and time required for load covering and uncovering. The apparatus can handle heaped loads that extend above the top of the container.

In accordance with embodiments of the present invention, there is provided an apparatus for covering an open top of a transportation trailer container, the apparatus comprising: an arm pivotable between a closed position and an open position, the arm holding a rotatable roller for dispensing and receiving a flexible cover, the flexible cover being wrapped around the roller when the arm is in the open position, the flexible cover being unrolled from the roller to cover the open top due to motion of the arm from the open position to the closed position, the arm pivotably mounted to an arm pivot; a recessed region comprising the arm pivot; and a secondary cover movable between a cover closed position and a cover open position, the secondary cover covering a top of the recessed region when in the cover closed position, the secondary cover biased toward the cover closed position, the secondary cover being overtop of the arm when the arm is in the closed position and the cover is in the cover closed position.

In some embodiments, the apparatus may include an actuating surface mechanically coupled to the arm, the actuating surface configured, when the arm moves from the closed position to the open position and the secondary cover is in the cover closed position, to contact and apply an outward force to the secondary cover, the outward force initiating movement of the secondary cover to the cover open position.

In some embodiments, the secondary cover is biased to move from the cover open position to the cover closed position when the arm pivots to the open position. In some further embodiments, the secondary cover is biased to move from the cover open position to the cover closed position when the arm pivots to the closed position. As such, the secondary cover can be closed when the flexible cover is in the open position to inhibit material from entering the arm mechanical components during bulk material loading. The secondary cover can also be closed when the flexible cover is in the closed position to cover the arm mechanical components during transportation.

In accordance with embodiments of the present invention, there is provided an apparatus for covering an open top of a transportation trailer container, the apparatus comprising: a frame disposed on top of the container, the frame surrounding an aperture for flow of material into the container; and an arm pivotable between a closed position and an open position, the arm holding a rotatable roller for dispensing and receiving a flexible cover, the flexible cover being wrapped around the roller when the arm is in the open position, the flexible cover being unrolled from the roller to cover the aperture due to motion of the arm from the open position to the closed position, wherein the frame includes a side portion having an inwardly and upwardly tapered outer surface, the roller contacting the outer surface when the arm is in the closed position.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Embodiments of the present invention provide apparatus for automatically deploying and retracting a flexible cover over an open top of a transportation trailer container. The container can carry bulk material such as wood chips, and the flexible cover can be used over heaped loads. The apparatus allows for deployment and retraction of the cover by remote control, without requiring an operator to climb to the container top or work at heights. The cover unrolled from and is rolled onto a rotating cylindrical roller, for deployment and retraction, respectively.

Figure 1:
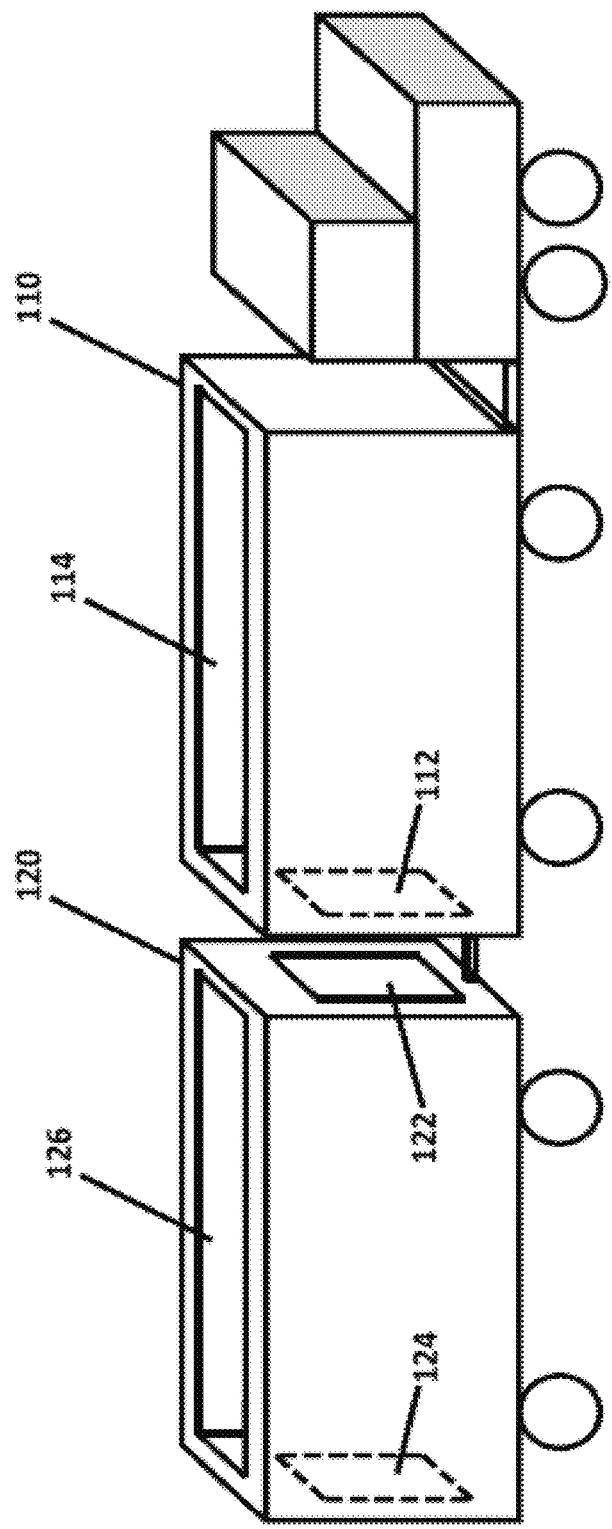
FIG. 1 illustrates a flow-through chip train for use with a covering apparatus provided according to an embodiment of the present invention.

FIG. 1 illustrates a flow-through chip train potentially having a covering apparatus provided according to an embodiment of the present invention. The chip train includes a lead trailer 110 and a pup trailer 120. The lead trailer has a rear door 112 and the pup trailer has a front door 122 and a rear door 124. With the chip train tilted to a certain angle, the doors on the lead and pup trailers can be opened so that wood chips in the lead trailer will exit the lead trailer rear door, and pass through the pup trailer to a destination. The lead and pup trailers also include open tops 114, 126 which are covered by a flexible cover such as a tarp (not shown). The covering apparatus of the present invention can be used on one or both of the lead and pup trailers. The vehicle of FIG. 1 can alternatively be used to carry other bulk materials.

Due to the chip train trailer front and rear doors, there is limited space in which to mount a covering apparatus. Furthermore, the front and rear doors are often of large size to allow increased flow of bulk material, thus further limiting space for the covering apparatus. Embodiments of the present invention therefore provide for a covering apparatus with a limited footprint, compatible with the chip train. For example, the covering apparatus may be confined to a narrow upper portion of the trailer, thereby leaving sufficient room for the inclusion of front and/or rear doors.

Figure 2:
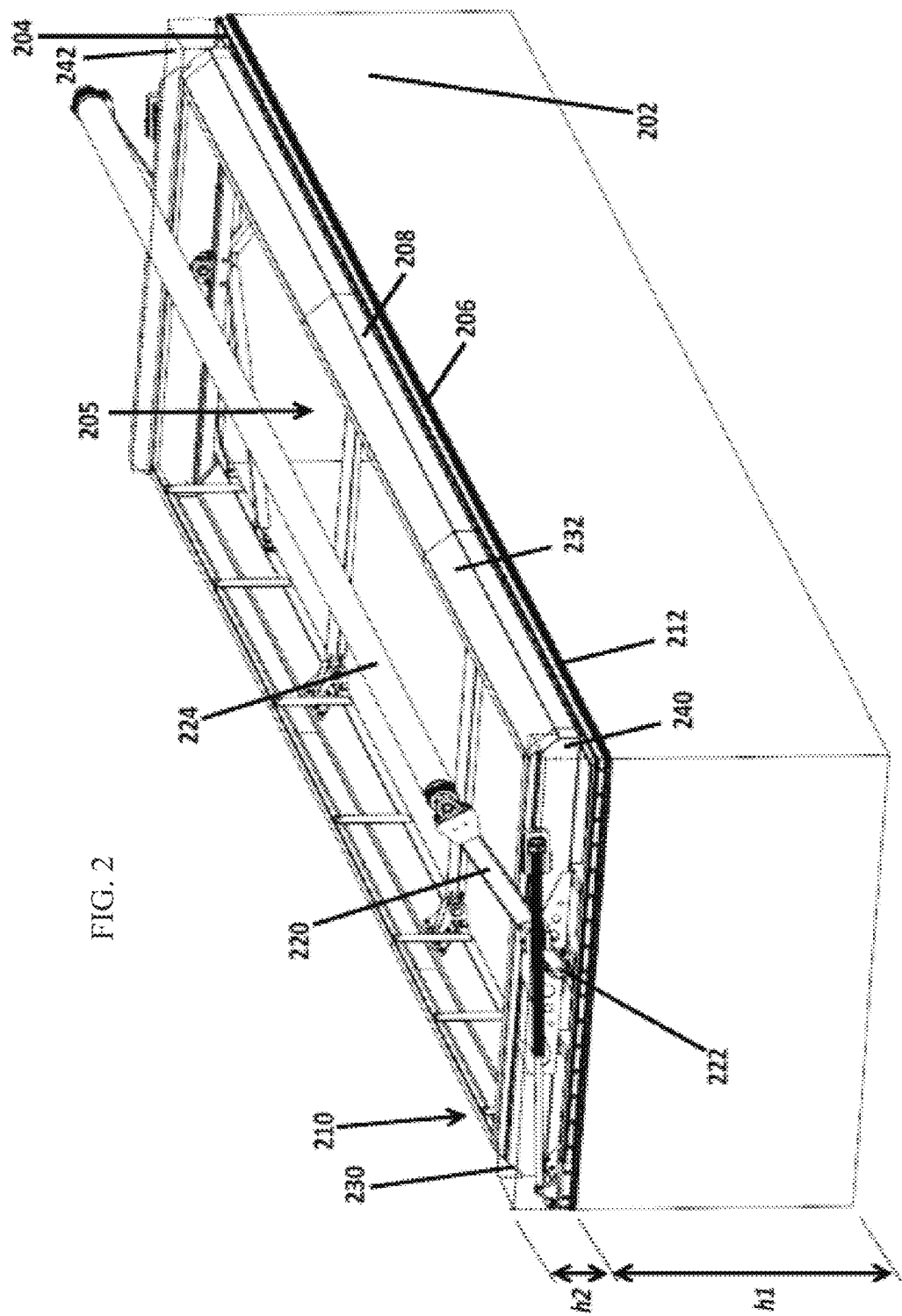
FIG. 2 illustrates aspects of a covering apparatus provided according to an embodiment of the present invention.

FIG. 2 schematically illustrates aspects of a covering apparatus provided according to an embodiment of the present invention. The apparatus is used for covering an open top of a transportation trailer container, such as that of a road trailer, and more particularly such as that of a trailer of a flow-through chip train or more generally a trailer carrying bulk material. Some details of the covering apparatus (such as the flexible cover, enclosures for the recessed regions 240, 242, and anchoring points for the arm and arm actuator) are omitted from FIG. 2 for clarity.

The apparatus includes a frame 204 disposed on top of the container 202, the frame surrounding an aperture 205 for flow of material into the container. The top of the container can be provided at a height that is less than a regulatory height limit for the trailer. In particular, where the height of the frame is h1 and the height limit is r, the top of the container can be at a height of h1+h2=r or less, where h2 is the height of the top rail extension. Such a height may be configured by custom construction or cutting of a previously constructed container, for example. As such, the trailer plus the frame are configured to be within the regulatory height limit. The frame has front, back, left and right sides, which generally align with front and back ends, and left and right sides of the container. In some embodiments, the height h2 can be designed to be as small or as large as possible within regulatory limits.

The apparatus includes an arm 220 which is pivotable between a closed position, in which an end of the arm is located on a first side 210 of the frame, and an open position, in which the end of the arm is located on a second, opposite side 212 of the frame. The arm is pivotably mounted to the frame at a pivot point location 222 along the front or back end, the location for example being approximately midway between the first and second sides. Matching and cooperating arms can be provided at both the front and the back ends of the frame. In the illustrated embodiment, the arm pivots from side to side rather than from front to back. As such, the arms are located on the front and/or back of the container. Because the container is longer than it is wide, this allows for a reduction in sizes of various features (e.g., arm length, recessed regions holding arms and associated mechanical components, recessed region covers, etc.)

The arm holds (or the arms hold) a rotatable roller 224 for dispensing and receiving a flexible cover (not shown in FIG. 2). The flexible cover is wrapped around the roller when the arm is in the open position, and is unrolled from the roller to cover the container due to motion of the arm from the open position to the closed position. As such, when the arm is in the open position, the container is uncovered, while when the arm is in the closed position the container is covered.

In various embodiments, the frame 204 includes a side portion having an inwardly and upwardly tapered outer surface 230. That is, the outer surface is disposed at an angle, such as but not limited to a 45° angle. The side portion is located so that the roller contacts and rests against this outer surface when the arm is in the closed position. This configuration provides for multiple features. First, bulk material such as woodchips is inhibited from accumulating on the outer surface due to the slope. Second, the non-vertical aspect of the outer surface acts as a stop that inhibits further motion of the arm and provides stability during transport by allowing the roller to rest against the surface. Third, the outer surface location and roller diameter can be figured so that, when the roller rests against the outer surface, outer and upper edges of the roller lie within regulatory height and width limits for the trailer. Fourth, the angled outer surface provides a more gradual change in surface profile which reduces potential damage to the flexible cover when contacting the outer surface of the container, in contrast to a 90° corner between top and sides of the container.

In some but not necessarily all embodiments, both sides of the frame can include inwardly and upwardly tapered outer surfaces. That is, the frame may include a second side portion opposite the first side portion, the second side portion having a second inwardly and upwardly tapered outer surface 232. The flexible cover, rolled onto the roller, contacts the second outer surface when the arm is (arms are) in the open position. Noting that the flexible cover will be (e.g., fully) rolled onto the roller in the open position, the second outer servers may be located and/or angled differently from the outer surface on the opposite side of the frame.

It is noted that the top rail extension may allow the original top frame of the trailer to be continuous, while allowing the structural integrity to be maintained. The top rail extension may also be retrofitted to an existing trailer, subject to height restrictions, if applicable.

In various embodiments, the frame is mounted to a top edge of the container such that a combined height of the transportation trailer container and the frame, including the arm(s) and the roller when in the closed position, is less than or equal to a regulatory road height limit defined for road trailers. In various embodiments, the width of the transportation trailer, including the apparatus when the arm(s) and the roller is in the closed position, is within a regulatory road width limit defined for road trailers.

In various embodiments, recessed or pocketed locations (e.g., the rectangular prism regions 240, 242 bounded by the frame and the dotted lines in FIG. 2) are provided. These recessed regions contain the arm(s) and its (their) associated mechanical elements, as can be seen in more detail in FIG. 3A. The recessed regions are located inwardly from the front and back ends of the container, respectively and below a top height of the frame, designated as region 302 in FIG. 3A. Within this region 302 is located various mechanical components for holding and operating the arm holding the roller, potentially along with related mechanical, hydraulic, pneumatic and/or electrical components. The size of the recessed regions can be limited or minimized so that only the required mechanical components are held therein, with little to no additional space. This can result in as wide a container opening (to be covered by the flexible cover) as possible. Use of a recessed region for housing the arms and associated components can allow the mounting of a cover system without exceeding height, length or width restrictions, including both operational and regulatory restrictions. In some embodiments, only one such recessed region is provided, at either the front or back of the container. A recessed region may be located within a rectangular prism volume defined by extreme edges of the transportation trailer. A recessed region may intrude into a volume of the transportation trailer container. In other embodiments, a recessed region is omitted and the arm(s) and associated mechanical elements extend upward and/or outward from the frame.

In some embodiments, and with reference again to FIG. 2, the frame 204 includes a lower rail portion 206, which may be structural to the frame, and an upper extension 208, which is not necessarily structural to the frame. The upper extension may include the tapered outer surface(s) 230, 232 as described above. The top of the lower rail portion may be level with a bottom of the recessed or pocketed locations, while the top of the upper extension may be level with a top of the recessed or pocketed locations. As such, the upper extension may be set inward from the front and/or back ends of the container so as to define the recessed regions.

Figure 3A:
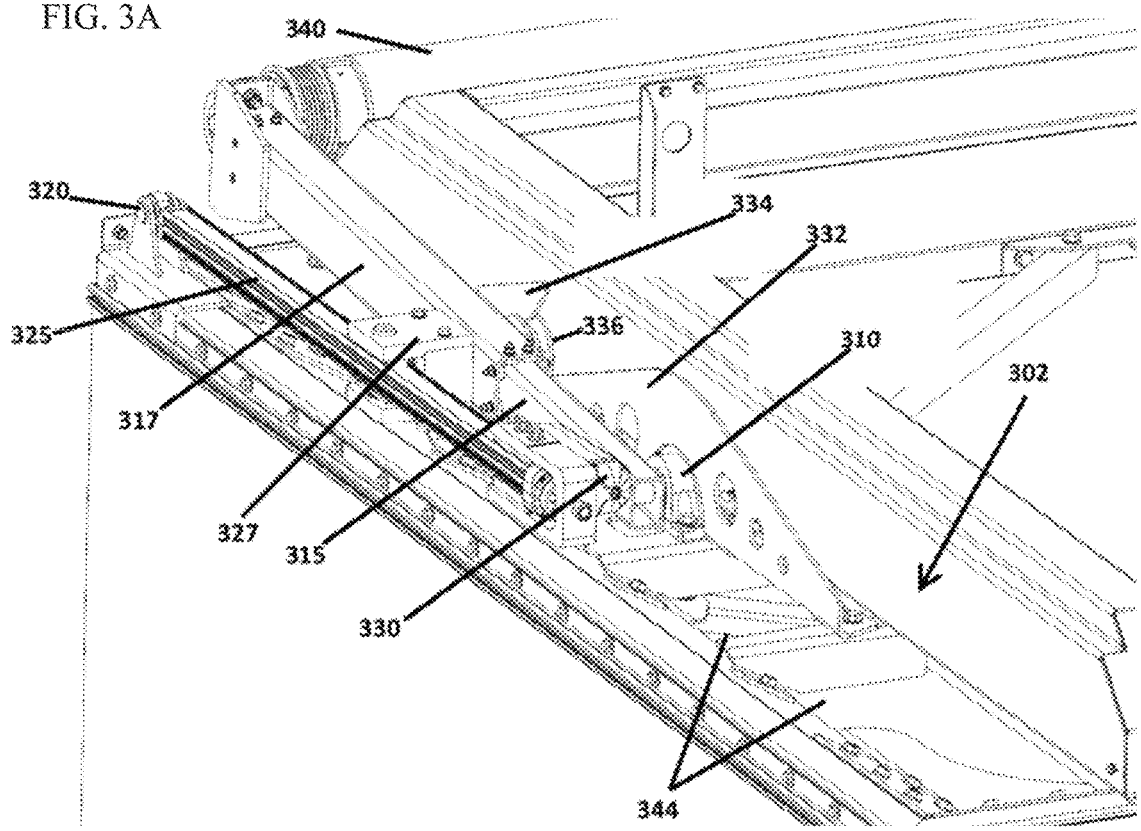
FIG. 3A illustrates further aspects of a covering apparatus, including details of a recessed region, provided according to an embodiment of the present invention.

As illustrated in FIG. 3A, the region 302 includes an arm pivot 310 (also referred to as a base), which is mounted to the frame and which is pivotably coupled to a proximal end of the arm (illustrated as having two portions 315, 317), for example by a trunnion or bearing mechanism. The region 302 further includes an arm actuator pivot 320 (also referred to as a base), which is also mounted to the frame and which is pivotably coupled to a first end of an arm actuator 325, for example by a trunnion or bearing mechanism. A second part of the arm actuator 325 (which may be a motorized telescoping rod) is pivotably connected to the arm using a pivot block 327. The pivot block 327 is connected to the arm portion 317 away from the arm pivot 310. The arm actuator may be a linear actuator, which comprises a straight section that is variable in length. In the presently illustrated embodiment, a motor 330 suspended at a non-anchored end of the arm actuator acts to vary the length of the arm actuator. By extending the arm actuator 325 the arm 315, 317 can be made to pivot away from the arm actuator pivot 320; by retracting the arm actuator the arm can be made to pivot in the opposite direction. The arm actuator can be a hydraulic actuator, such as a piston mechanism, or an electric or pneumatic actuator, chain-driven actuator, etc.

In one embodiment, the arm actuator is mounted via a rod eye to the pivot block 327, and is also mounted to a trunnion 320. The trunnion is pivotable in a vertical plane, and may include a second swivel that allows horizontal rotation once it attaches to the arm 315, 317. By allowing the trunnion to pivot in two directions, side forces and bending moments can be inhibited from damaging an actuator which is only intended to encounter axial forces. The movement of the actuator drives the angular movement of the arm. The angular movement can also cause telescopically varying length of the arm, as will be described below.

In a particular embodiment, the arm actuator is an electric actuator, which is powered by a battery mounted to the transport trailer. For example, the battery can be mounted at a midpoint of the trailer, under the top rail. This high-midpoint location serves to limit the length of wires to each linear actuator (in embodiments in which linear arm actuators are provided at both front and rear of the container to actuate a corresponding pair of arms). The battery can be trickle charged for example by connection to a main battery of the road tractor towing the trailer. The use of a trickle charged battery can mitigate the need to run larger-gauged wires between the arm actuator and the road tractor. Operation of the arm actuator can be performed using an electrical controller, such as a toggle switch or other switch or control. Controls can be used to operate the actuator arm to both close and open the cover. In some embodiments, a wireless controller, such a Bluetooth® controller can be provided for remotely causing the arm actuator to move in a desired direction.

In some embodiments, a wired or wireless control pendant is located at the rear passenger side. The control pendant includes a toggle that allows an operator to cause the arm to move toward the open or closed position. A synchronization button and associated wireless electronics can be provided to synchronize the controller with an operator's smartphone, e.g., via a Bluetooth® wireless device. An application running on the smartphone also has controls such as "open" and "close" buttons on the smartphone's touchscreen that allow the operator to remotely control the apparatus from a distance. Other control mechanisms may also be used, as would be readily understood by a worker skilled in the art.

In an alternative embodiment, the arm actuator can be omitted and another mechanism can be used to move the arm between the closed and open positions. For example, a rotating motor can be provided between the arm and the roller, such that rotation of the motor in one direction causes the roller to take up the flexible cover, thereby drawing the arm toward the open position. Rotation of the motor in the opposite direction causes the roller to let out the flexible cover and also causes a spool, which is coaxial with the roller, to take up a cable which is anchored on the opposite side of the container as the flexible cover, thereby drawing the arm toward the closed position.

Figure 4A:
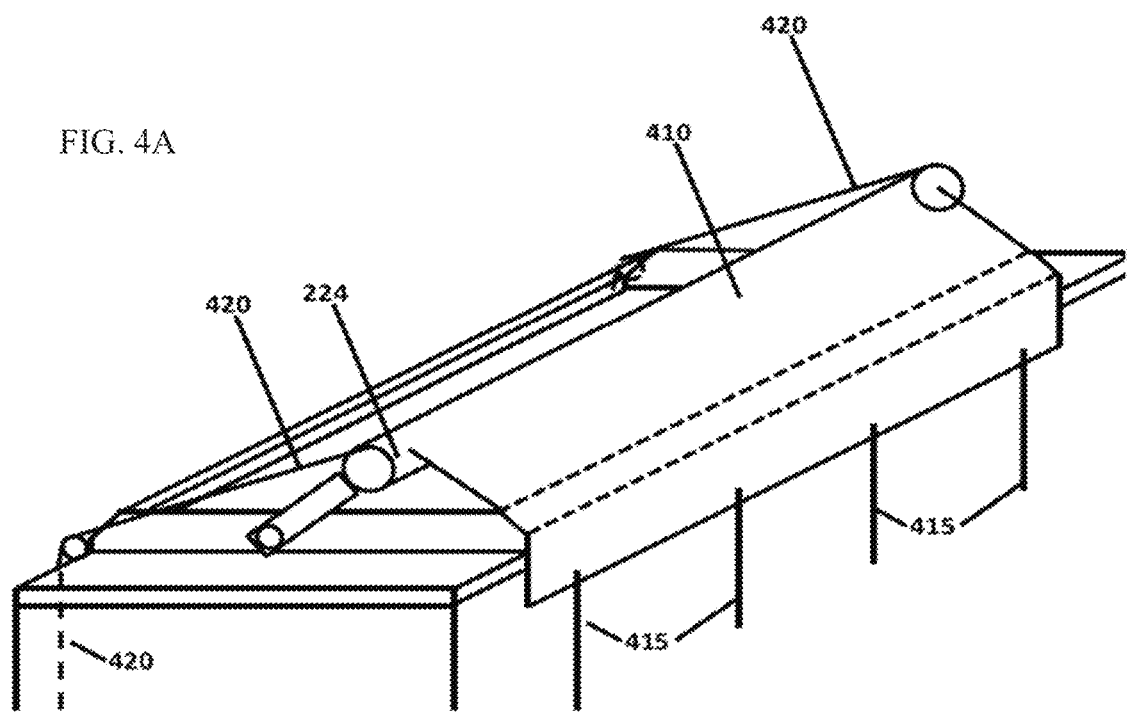
FIG. 4A and FIG. 4B illustrate aspects of a covering apparatus, including a flexible cover and roller, provided according to an embodiment of the present invention.
Figure 4B:
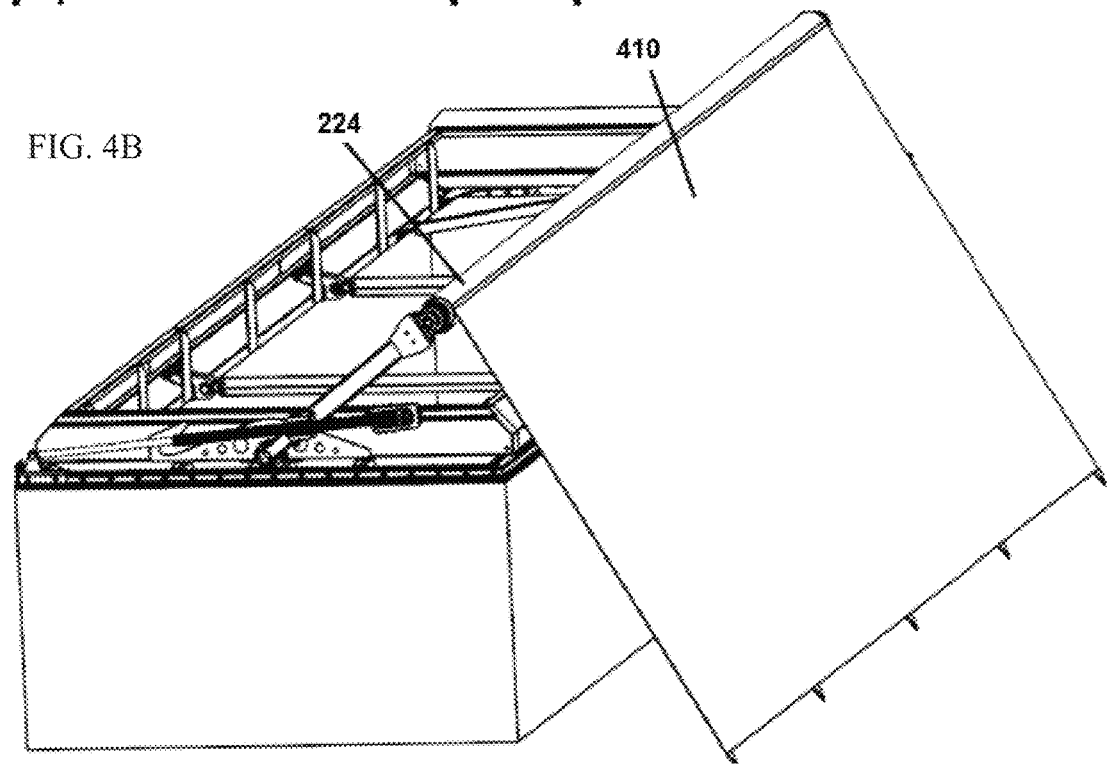

In one embodiment, and with reference to FIG. 4A and FIG. 4B, the flexible cover 410 is attached to the roller 224. FIG. 4B illustrates a view of an example apparatus including some of the elements of FIG. 4A, with some details omitted for clarity. In FIG. 4B, the flexible cover in FIG. 4B is not anchored to the container. The roller 224 may be supported by two arms, one at each end, using bearings. Rotation of the roller in one direction is accomplished by tensile force exerted by the flexible cover on the roller when the arms are moved away from the side of the container to which the flexible cover 410 is anchored using anchoring bodies 415. The anchoring bodies 415 may be cables, or resilient elastic bodies, for example. This rotation also causes cables 420 at either end of the roller to be wrapped up on the roller or associated coaxial spools, and the cover to become unwrapped, covering the load. When the arm travels in the opposite direction, the tension in the cables 420 causes the roller to rotate in the opposite direction, so that the flexible cover is taken up by the roller. The cables are also anchored to the container either directly or via another resilient elastic anchoring body.

In some embodiments, and with reference again to FIG. 3A, the recessed region 302 includes a ramp 332 and optionally also a retention hook 334 or, more generally, a retention body. A support roller 336 is connected to the arm 315, 317 and is supported on the ramp 332. When the arm 315, 317 is in the closed position (as illustrated), the support roller 336 is disposed between the ramp 332 and the retention hook 334. This assists in retaining the arm, and hence the flexible cover, in the closed position during transport. The support roller is disposed to rest on and roll along the ramp during motion of the arm. The ramp may have a width that is narrower than a bulk material (e.g., wood chips) to be carried in the container, thereby inhibiting accumulation of the bulk material on the ramp (which could stall operation of the arm). For example, the ramp may be a "knife edged" ramp and the support roller may include a V-shaped groove which receives the ramp. As such, the retention body is located in the recessed region and overtop of the support roller when the arm is in the closed position, and the retention body is configured to inhibit upward motion of the support roller away from the ramp, thereby assisting retaining the arm in the closed position. This inhibits the flexible cover and roller from lifting during transport.

Figure 5A:
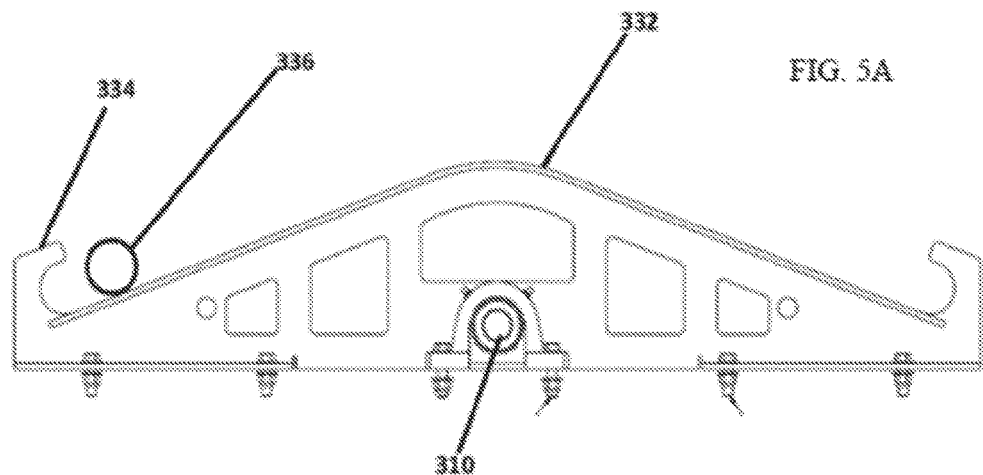
FIG. 5A and FIG. 5B illustrate further aspects of a covering apparatus, including a ramp and support roller, provided according to an embodiment of the present invention.
Figure 5B:
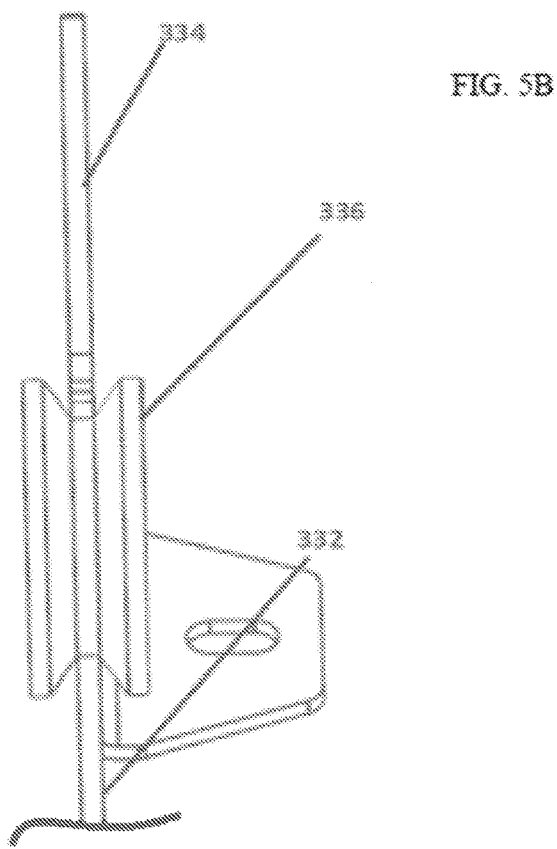

FIG. 5A and FIG. 5B illustrate additional views of the ramp 332, the retention hook 334, and the support roller 336, according to an embodiment of the present invention. FIG. 5B illustrates the limited width of the ramp surface and the grooved support roller.

In some embodiments, and with reference again to FIG. 3A, the arm is a telescoping arm, having a lower arm portion 315 coupled to the arm pivot (base) and an upper arm portion 317 coupled to the roller 340 and the support roller 336. The upper arm portion 317 is also coupled to the arm actuator 325 through a pivot and double trunnion of the pivot block 327. The lower arm portion and the upper arm portion are relatively movable to provide a telescopically variable length of the arm. The ramp is located and shaped to vary length of the arm according to a predetermined profile as the arm pivots between the open position and the closed position and the support roller 336 is correspondingly forced to vary its path by the presence of the ramp 332. In some embodiments, use of a telescoping arm can facilitate the ability of the cover to clear heaped loads. Additionally, or alternatively, use of a telescoping arm can reduce the amount of pivot force associated with pivoting of the arm, by lowering the moment arm from the roller. Additionally, or alternatively, use of a telescoping arm can allow for a shorter arm length, thereby lowering wind sail effects.

Figure 3B:
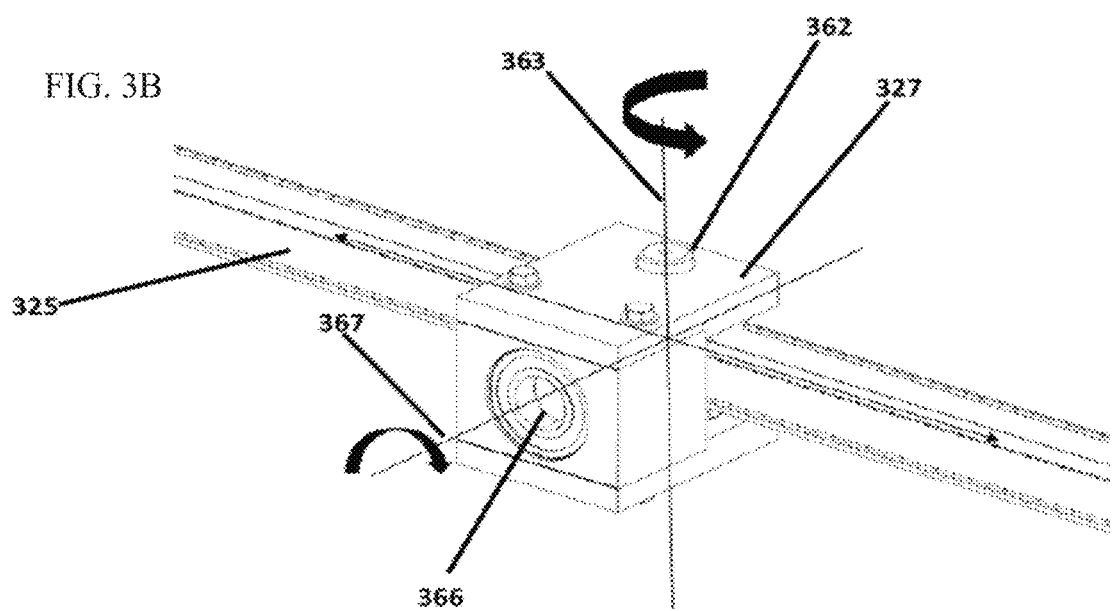
FIG. 3B illustrates a detail of FIG. 3A, according to an embodiment of the present invention.

In some embodiments, the support roller 336 and the ramp 332 are configured to support the arm during its pivoting motion and also to assist in arm pivoting. For example, the ramp may assist in reducing the amount of force required to pivot the arm on an upward trajectory. This facilitates an efficient arm pivot between fully open and fully closed positions, in terms of force required to pivot the arm. When used with a telescoping arm, the shape of the ramp facilitates extension of the arm so that its outer end (at which the roller is located) reaches the edge of the trailer when in the fully open and fully closed positions. Furthermore, the ramp may facilitate an efficient arm rotation FIG. 3B illustrates a double trunnion operation of the pivot block 327 in more detail, according to embodiments of the present invention. The arm actuator rod 325 is pivotably connected to the pivot block 327 via a first trunnion mechanism 362, which allows relative rotation of the arm actuator rod 325 and the pivot block 327 about a first axis 363. The pivot block 327 is pivotably connected to the upper arm portion 317 of the telescoping arm via a second trunnion mechanism 366, which allows relative rotation of the pivot block 327 and the telescoping arm about a second axis 367. The combination of the first and second trunnion mechanisms 362, 366 allows for relative pivoting of the arm actuator rod 325 and the telescoping arm in two different axes of rotation. This mitigates the impact of side forces and bending moments on the arm actuator mechanism.

In one embodiment, the telescoping arm may be a two-part "tube-in-tube" extending arm. The lower arm portion 315 is slideably received within the hollow upper arm portion 317. The upper arm portion is attached to the roller 340 using a bearing. The bottom of the upper arm portion is also connected, on the side facing outward toward the container edge, to a pivot block 327 coupled to the linear arm actuator 325. The bottom of the upper arm portion is also connected, on the side facing inward away from the container edge, to a V-groove roller 336. The lower arm portion slides into and out of the upper arm portion. The upper arm portion 317 is hollow to facilitate this sliding in a telescoping manner. Sliding pads between the lower and upper arm portions may be provided. The base of the lower arm portion may be attached to the container frame using a shaft and two pillow block bearings, or using other pivoting mechanisms, such as flanges, bearings, bushings, etc. The V-roller 336 rests and rolls over on an arced ramp 332 surface. In some embodiments, a pivot axis of the pivot block 327 is coaxial with the axis of the V-roller 336. The V-roller may have a V-shaped profile. Alternatively, the V-roller may have another profile, and may be replaced with an ungrooved roller in some embodiments. By changing the profile of the arc in relation to the center pivot of the arm, a cam mechanism is provided, in which the upper arm portion will telescopically slide relative to the lower arm portion in response to changes in the angular position of the arm. A first portion of the ramp that is directly above the center pivot 310 of the arm is the portion that is closest to the center pivot. Therefore, when the arm is approximately vertical, the V-roller is at the closest position to the center pivot and the overall arm length is at its shortest. Distance between the center pivot and the ramp generally increases for portions of the ramp away from this first portion of the ramp. The distance between at least some portions of the ramp is greater than the distance between the center pivot of the arm and the V-roller, and thus the ramp acts to telescope the arm when the V-roller rests on these portions. When the arm is in the fully open and/or fully closed position, the telescoping arm may be substantially fully extended.

Because the recessed regions 240, 242 are set back from the ends of the container and is below the top height of the frame, the arm's base 310, arm pivot, at least part of the arm 315, 317 itself, and associated components such as the arm actuator 325, roller ramp 332, etc., are all located within a maximum size envelope defined by transportation regulations and below the top height of the frame. For example, the components can all be located inwardly from the outer edge of a frame holding the container. As another example, the components can all be located inwardly from the container sides and ends. This is particularly the case when the arm is in the fully closed (substantially horizontal or close to horizontal) position, and optionally also when the arm is in the fully open (substantially horizontal or close to horizontal) position.

In more detail, when the arm is in the fully closed position, a significant or major portion of the arm lies fully below the top height of the frame and thus (with the exception of an end region holding the roller) is fully within the recessed region 240, 242. Further, the arm actuator is also, by nature of its connection, substantially horizontal or close to horizontal when the arm is in the fully closed position, and thus the arm actuator also lies within the recessed region 240, 242. In various embodiments, this configuration is also achieved when the arm is in the fully open position (except with the arm now pivoted toward the opposite side of the frame).

This location of components inwardly from the container ends and below the top height of the frame facilitates conformity of the apparatus to regulatory road height limits, and road length limits, if applicable. This configuration also avoids protrusion of such components beyond the front (or back) end face of the container, which could potentially inhibit tight turns of the vehicle-trailer combination (e.g., chip train) due to contact between the components and a tractor or other trailer. As such, tighter turns are facilitated in embodiments of the present invention.

In some but not necessarily all embodiments, a design principle is followed in which surfaces are configured to limit or inhibit the collection of bulk material. For example, the surfaces can be vertically sloped or curved. In various embodiments, outer surfaces of the frame or components thereof are configured and/or sloped to at least a degree that inhibits the accumulation of certain types of bulk material (such as wood chips) thereon. Thus, for example, the side portions of the frame have outer surfaces 230, 232 which are inwardly and upwardly tapered, and the ramp 332 on which the arm's support roller rests is narrow. A surface at the bottom of the recessed region can be similarly sloped. Where necessary, some surfaces are flat or unsloped to allow for features such as tarp sealing or to mitigate wear on the flexible cover. For example, an unsloped lip along the outside of the top rail extension can be provided. As another example, a flat horizontal surface (or alternatively a rounded edge or downwardly sloping surface) may be provided at the top of the sloped outer surfaces 230, 232, in order to mitigate wear on the flexible cover.

In various embodiments, and with reference again to FIG. 3A, the bottom of the recessed region includes one or more gaps 344 or openings that communicate with the container. The gaps or openings can be designed with maximal area, within the constraints imposed by the apparatus area and the requirement to include other structural elements and moving mechanisms. As such, bulk material that falls into the recessed region can flow through the openings into the container, to inhibit accumulation in the recessed region. Sloped surfaces in the recessed region can slope toward such openings. The gaps 344 in the bottom of the recessed region, along with the use of sloped surfaces, together inhibit the collection of bulk material in undesired locations, such as the recessed region.

Figure 6A:
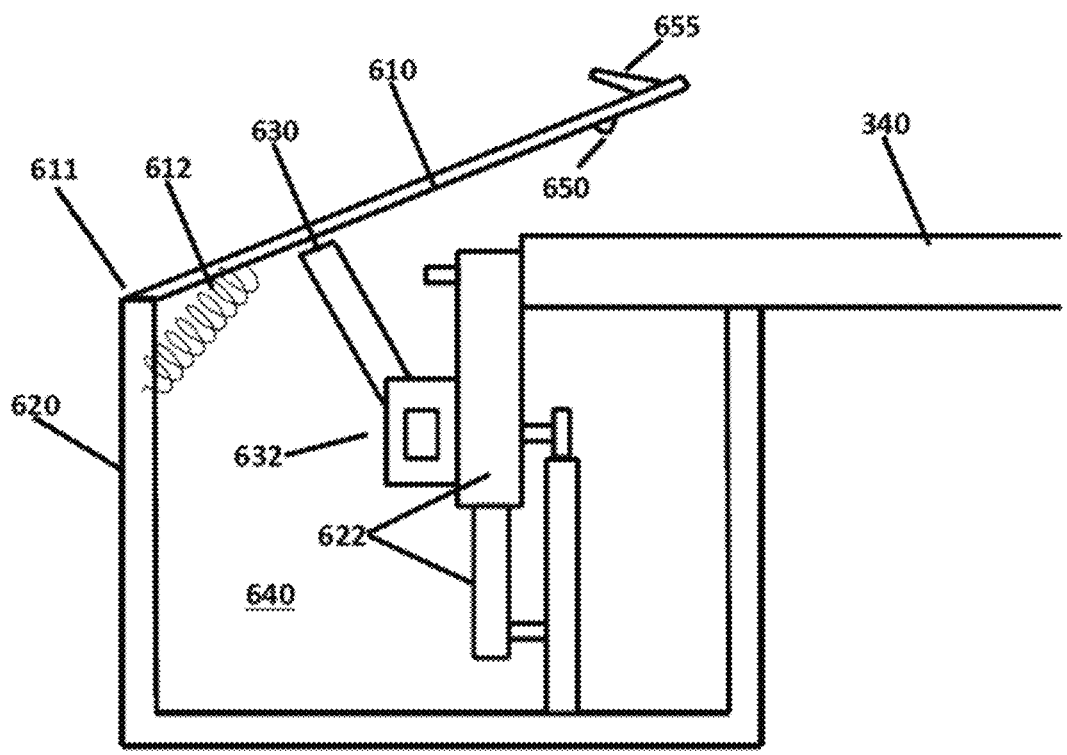
FIG. 6A illustrates a side view of a recessed region for a covering apparatus and associated cover, according to an embodiment of the present invention.

In various embodiments, and with reference by way of example to FIG. 6A, a movable secondary cover 610, hinged along one edge, is located overtop of the recessed region 640. FIG. 6A illustrates a partial side view of the recessed region including the secondary cover. The secondary cover 610 is movable between a cover closed position and a cover open position. In the cover closed position, the secondary cover is disposed overtop of and covers the recessed region. The secondary cover may be biased toward the cover closed position, for example by use of a spring 612. The secondary cover is overtop of the arm 622 when the arm is in the closed position and when the cover is in the cover closed position. A stopper tab (not shown) can be provided on the outside of the container which inhibits the secondary cover from opening and/or closing beyond a certain amount.

The secondary cover is movable between the cover closed and opened positions, for example by hinged connection 611 to the frame. In the illustrated embodiment, an end wall 620 coplanar with the container face extends upward and is hingedly connected to the secondary cover. In other embodiments, however, the secondary cover may be hingedly connected to the frame along a different edge. The end wall 620 assists in enclosing the recessed region. In other embodiments, a separate hinge is omitted, and the secondary cover is constructed at least partially out of a resilient, flexible material (e.g., rubber or urethane). The hinge can then be regarded as a portion of the flexible material. The material is biased toward a shape and orientation that causes the secondary cover to be in the closed cover position. As such, the secondary cover may be a flexible secondary cover that is movable between the cover closed and cover open positions by flexing thereof. The flexible secondary cover may be resilient, or include resilient portions, which bias it toward the cover closed position.

The secondary cover may be configured to move to the cover closed position when the arm is in the closed position.

Additionally, in some embodiments, the secondary cover may be configured to move to the cover closed position when the arm is in the open position. The secondary cover is in the cover open position at least to allow the actuating arm to move between the closed and open positions. The secondary cover is in the cover closed position when the arm is in the open position to inhibit material from falling inside the recessed regions 240, 242 during loading. Likewise, the secondary cover is in the cover closed position when the arm is in the closed position to inhibit material from entering the recessed regions 240, 242 during transportation.

An actuating surface 630 is mechanically coupled to the arm and configured, when the arm moves from the closed position to the open position (and/or vice-versa) and the secondary cover is in the cover closed position, to contact and apply an outward force to the secondary cover. In some embodiments, the actuating surface may be a portion of the arm itself. The outward force initiates movement of the secondary cover to the cover open position. The actuating surface is positioned to contact and push the cover outward in advance of the arm passing through the opening previously covered by the secondary cover. In some embodiments, the actuating surface 630 is rigidly or pivotably connected to and extends from the arm 622. In other embodiments, the actuating surface is rigidly connected to and extends from the arm actuator (e.g., linear actuator). In some embodiments, and as illustrated in FIG. 6A, the actuating surface 630 is connected to and extends from the trunnion block 632 (or other attachment mechanism) which also attaches the arm 622 to the arm actuator. The actuating surface may comprise, at its end, a material that easily slides against the secondary cover.

In some embodiments, when the secondary cover closes both when the arm is in the open position and the closed position, two actuating surfaces (or two portions of the same actuating surface) are provided. A first actuating surface operates to lift the secondary cover when the arm moves away from the closed position. A second actuating surface operates to lift the secondary cover when the arm moves away from the open position. n other embodiments, the same actuating surface operates to lift the secondary cover when the arm moves in either direction.

When the actuating surface moves away from the secondary cover, in response to the arm nearing the closed position or the open position, the cover is biased, e.g., due to the spring 612 and/or gravity, to move to the cover closed position. When the secondary cover is in the closed position, the secondary cover inhibits debris, such as bulk material, from entering the recessed region, and inhibits escape of bulk material during transport.

The actuating surface may include a sliding block attached to the arm actuator trunnion. When the arm actuator extends, one end raises upward due to connection to the arm. Due to this upward motion, the sliding block engages the cover's interior surface and subsequently pushes the secondary cover upward and out of the way of the arm and arm actuator. The sliding block can be configured to pivot to maintain contact against the cover. Additionally, or alternatively, the end of the sliding block may have a curved shape.

Figure 7A:
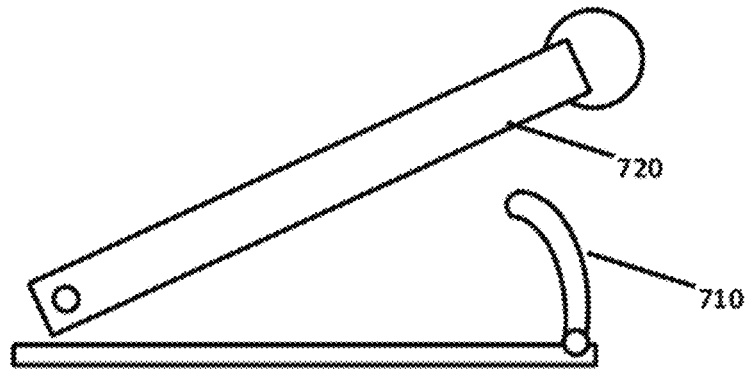
FIG. 7A to FIG. 7C illustrate a movable side flap provided in accordance with embodiments of the present invention.
Figure 7B:
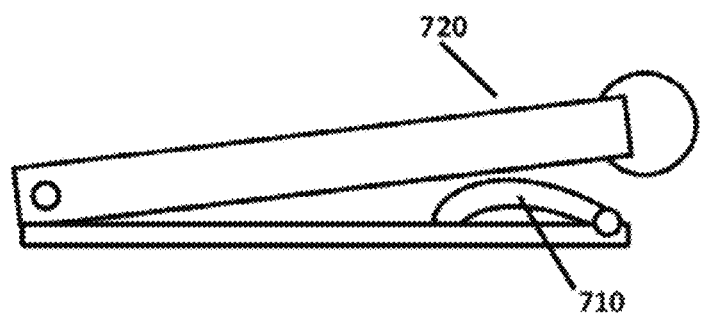
Figure 7C:
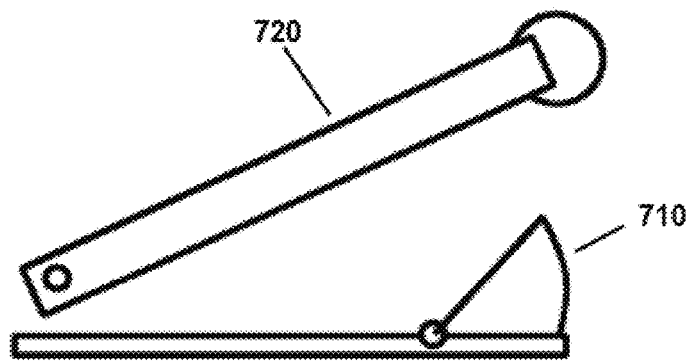

In some embodiments, and with reference to FIG. 7A and FIG. 7B, a movable side flap 710 is located on a side of the recessed region. Such side flaps may be located on one or both sides of one or both of the recessed regions (as applicable). The side flap is movable between a side flap closed position (FIG. 7A) and a side flap open position (FIG. 7B), and may be biased, e.g., by a spring, toward the side flap closed position. As an end of the arm 720 moves into the location occupied by the side flap 710 (FIG. 7B) (e.g., due to the arm being in the open position or the closed position, depending on the location of the side flap), the arm pushes the side flap from the side flap closed position to the side flap open position. As the end of the arm 720 moves away from the location of the side flap 710 (FIG. 7A), the side flap moves into the side flap closed position. As such, the side flap, when in the closed position, covers a side of the recessed region in order to assist in enclosing the recessed region to keep out debris, reduce air flow during transportation, etc. The side flap is movable to the open position to allow the arm to extend outward from the side of the recessed region when required. In some embodiments, the side flap is provided on the side on which the arm is located when in the open position. The side flap may be straight, rather than curved. The side flap may be inwardly angled or otherwise configured so that it pivots inward and downward when the arm impinges downward on the side flap. The side flap may alternatively be wedge shaped and pivotably coupled to the frame at a different location (FIG. 7C).

As described above, some embodiments of the present invention include a secondary cover 610 which completely covers the top of the recessed region when the arm is in both the closed position and the open position, and further include a bottom of the recessed region having one or more gaps 344 or openings that communicate with the container. In such embodiments, and due to the combination of these features, bulk material is inhibited from collecting in the recessed region both during container loading and container transport. This is desirable to avoid the bulk material jamming the moving parts in the recessed region. Further, the secondary cover inhibits potential escape of the bulk material by upward flow through the gaps or openings during transport, and also inhibits air flow that could cause such bulk material escape. Covering of the recessed region during transport also protects the mechanical components therein from debris such as snow, ice, and dirt during transport.

In various embodiments, the (e.g., spring-biased) secondary cover 610 and the side flap(s) 710 operate together to enclose the recessed region when the arm is in the open and/or closed position.

In some embodiments, the flexible cover (held by the roller 340), when in the closed position, includes a portion proximate to its front or back edge which is covered by the rigid (or alternatively non-rigid) secondary cover 610 which is hingedly connected and covers the recessed region. That is, the secondary cover 610 overlaps the end of the flexible cover. This configuration is apparent in FIG. 6A. The secondary cover 610 thereby assists in anchoring the flexible cover to the container, and further assists in sealing the load into the container. In some embodiments, a rubber or metal extension 650 protrudes downward from the bottom of the secondary cover 610 to contact and push the flexible cover downward to facilitate such anchoring. To facilitate this configuration the cover may be hingedly connected along the outside edge of the container.

In some embodiments, the secondary cover 610 includes a deflector 655 mounted to the edge of the cover opposite the hinged edge. Alternatively, the deflector can be mounted to the frame (e.g., the top rail extension) at a location just forward of the cover when closed, rather than the cover. The deflector may be made of resilient material such as rubber and is angled downward relative to the cover 610. The deflector is angled such that when air travels over the cover during transport, the air exerts a downward force on the deflector which inhibits the cover from lifting. In some embodiments, at least the cover at the rear end of the container includes such a deflector. The deflector extends along the width of the secondary cover.

The secondary cover 610 over the recessed region can be provided in a variety of forms. For example, the secondary cover can be a complete one-piece cover. The secondary cover may include a skirt, such as a rigid or flexible skirt which surrounds at least a portion of the cavity. The secondary cover may include a substantially flat hinged top.

When two arms are provided at the front and back of the container, respectively, two recessed regions 240, 242 can be provided at the front and back of the container for housing the arm pivots and other associated components. Further, two secondary covers 610 as described herein can be provided for covering each of the recessed regions, i.e. at both the front and rear edges of the container. Each secondary cover can have some or all of the features as described above. In some embodiments, only one of the front and back arms includes an arm actuator.

In some embodiments, the secondary covers 610 are flat sheets of material, such as metal, plastic, or fiberglass. In some embodiments, the secondary covers 610 may have downward extensions along at least one edge. The secondary covers 610 may be hingedly attached to the frame 204 or lower rail portion 206 thereof rather than to the upper extension 208. In some embodiments, the secondary cover may be a single, unitary body. his may inhibit the accumulation of debris around the secondary cover.

Figure 6B:
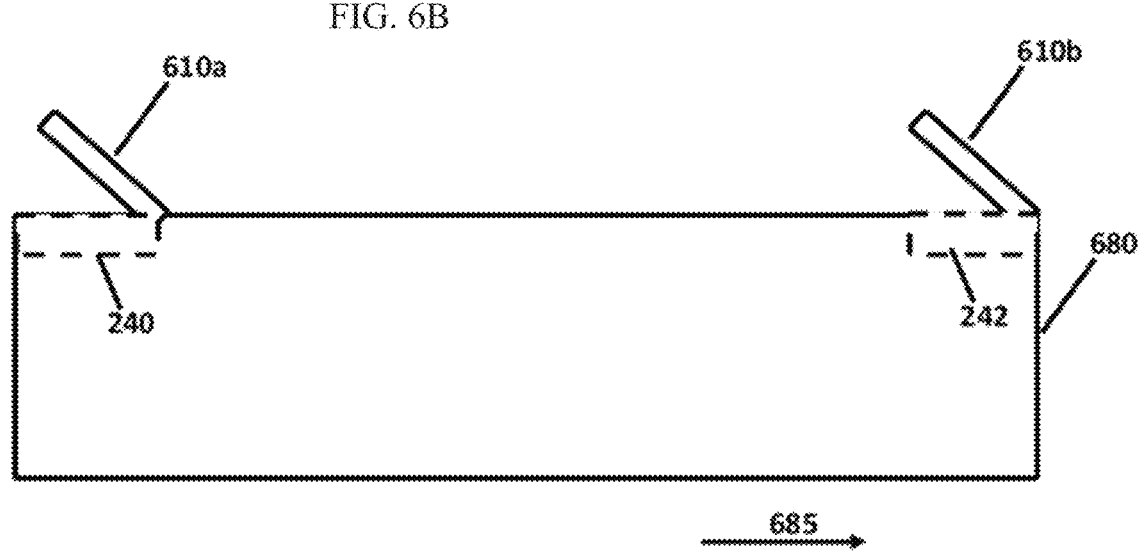
FIG. 6B illustrates a side view of recessed regions and their associated covers, according to another embodiment of the present invention.

FIG. 6B illustrates an embodiment in which the two recessed regions 240, 242 are covered with secondary covers 610a, 610b, respectively. The secondary covers are hinged toward a leading edge 680 of the trailer, with respect to a forward direction of motion 685 of the trailer during transport. As such, during transportation, the secondary covers are inhibited from lifting due to placement of the hinges. The secondary covers can be lifted using an actuating surface mechanism as described elsewhere herein. One or both of the recessed regions 240, 242 can be provided with secondary covers which are hinged along the leading edge. Where only one recessed region is provided, only one secondary cover is provided.

Figure 6C:
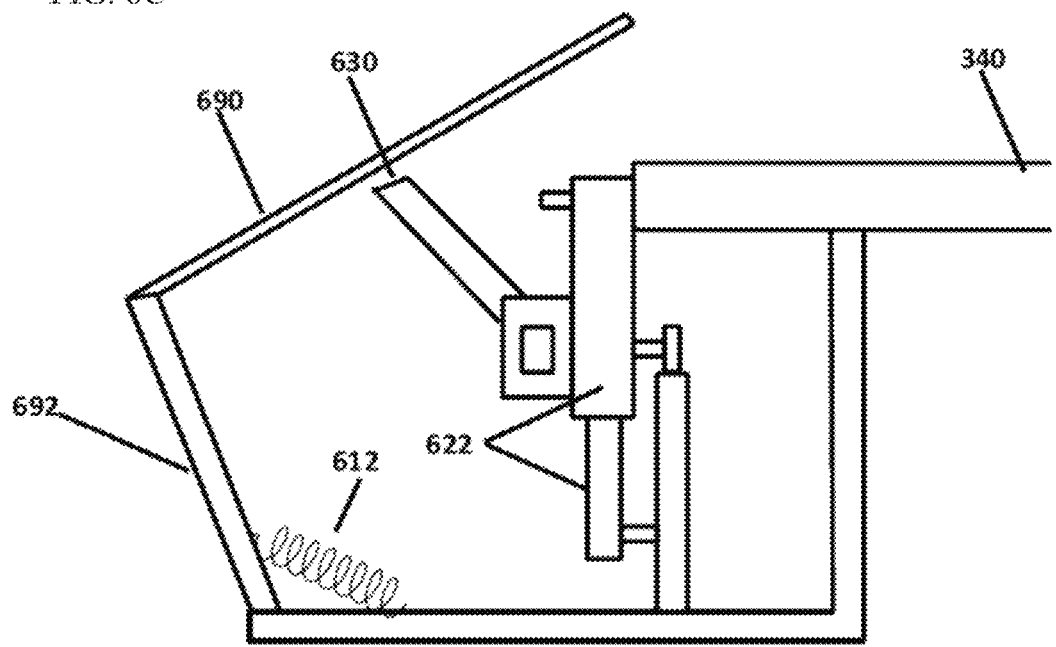
FIG. 6C and FIG. 6D illustrate a recessed region for a covering apparatus and associated cover, according to another embodiment of the present invention.
Figure 6D:
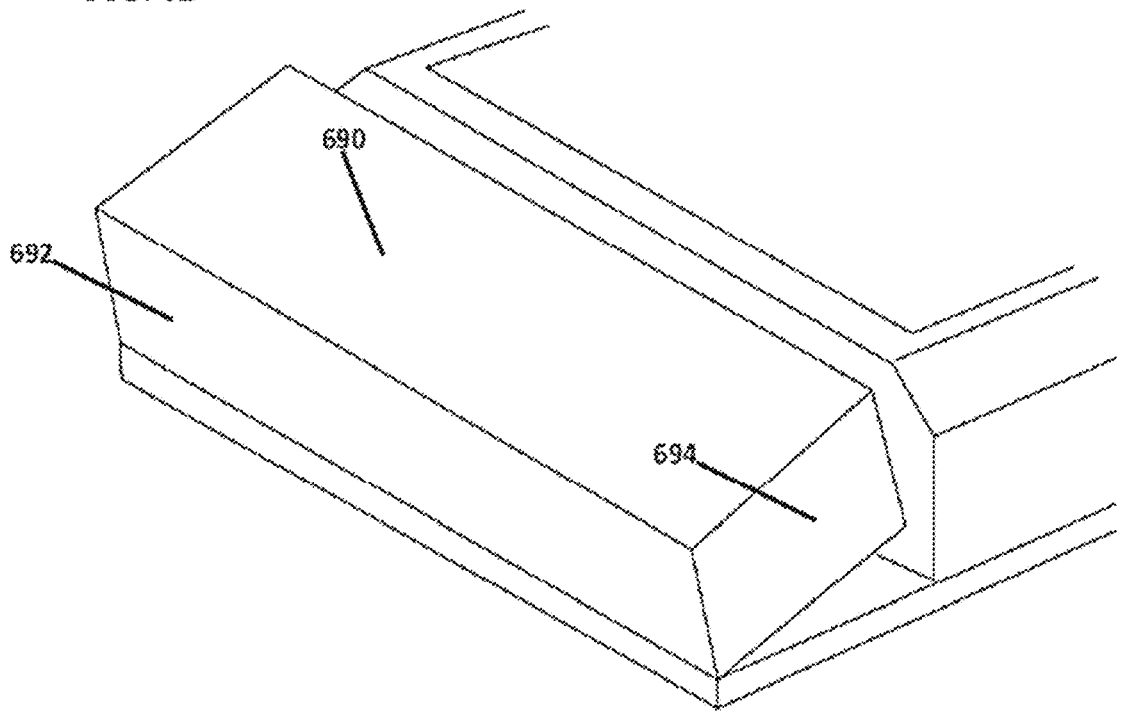

FIG. 6C and FIG. 6D illustrate a recessed region for a covering apparatus and associated cover 690, according to another embodiment of the present invention. In this embodiment, the cover 690 includes a top portion and sidewalls extending downwardly from the top portion. The cover thus encloses the recessed regions using a horizontal top portion, a vertical end portion 692, and two vertical sidewall portions 694, which are connected together. The cover is hingedly connected at the bottom edge of the vertical end portion 692. A spring 612 or other biasing means can be provided to bias the cover 690 into the closed position.

As mentioned above, as illustrated for example in FIG. 4A and FIG. 4B, the flexible cover 410 is received and dispersed by a roller 224 held at the end of the arm, while a coaxial spool disperses and receives a cable 420. The flexible cover is anchored to a first side of the container (the side at which the arm is located when in the open position), while the cable is anchored to a second side of the container opposite the first side. In various embodiments, one or both of the flexible cover and the cable are anchored to the container via one or more resilient elastic anchoring bodies 415, such as a shock cord (e.g., bungee cord). A first end of each anchoring body is attached to the container, while an opposite end is attached to a cable (which is in turn attached to the flexible cover or roller) or to the flexible cover directly. The anchoring bodies exert a downward force onto the cover and/or the cable, thereby providing a self-tensioning mechanism which keeps the flexible cover taut against the container and/or the container load. For example, the anchoring bodies may maintain a constant tension on the cover to continue to seal the bulk material (e.g., wood chips) while the heaped load settles. The anchoring bodies do not have to be removed during regular automated use.

In some embodiments, the self-tensioning mechanism comprising the resilient elastic anchoring body/bodies is configured so that the same amount of flexible cover is deployed when the arm is in the closed position, regardless of the amount of heaping of the load above the container top. This can be due to a variable excess portion of the flexible cover (i.e., a portion not required for covering the container top and potentially heaped load thereof) being drawn down the first side of the container by the elastic anchoring body/bodies located on the first side and holding the cover. As the load settles (e.g., during transport), the flexible cover can be maintained taut by force exerted by the anchoring bodies and further drawing down of the cover.

In some embodiments, cables 420 coupled to spools at either end of the roller are kept taut by elastic anchoring bodies 415 anchored to the container side. The spools may have grooves to receive the cables. In some embodiments, the length of the spools may be such that only one layer of cable is wrapped thereupon when the arm is in the fully open position. Pulley wheels may be mounted to the side of the trailer and the cable threaded over the pulley wheels, in order to redirect the cables from the roller downward for anchoring by the elastic anchoring bodies.

Figure 8A:
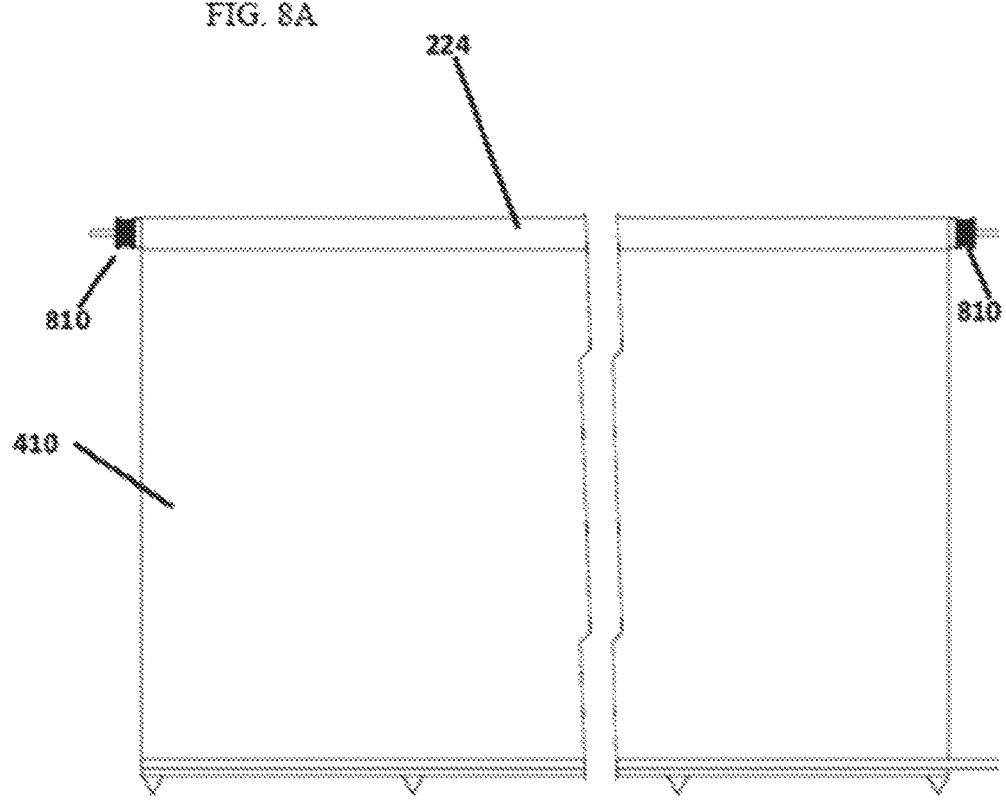
FIG. 8A illustrates a roller and flexible cover of a covering apparatus, according to an embodiment of the present invention.
Figure 8B:
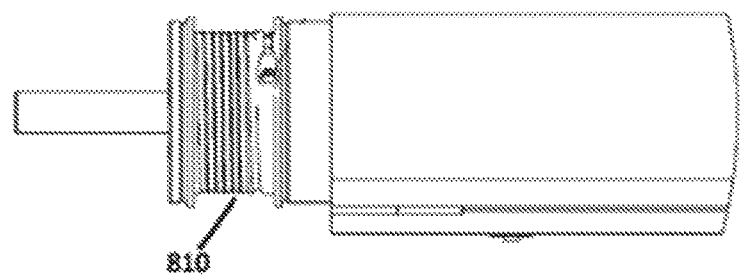
FIG. 8B illustrates an enlarged view of one of the grooved spools of FIG. 8A, according to an embodiment of the present invention.

FIG. 8A illustrates another view of the roller 224, including the grooved spools 810 on either end for receiving cables (enlarged in FIG. 8B). The flexible cover 410 is shown partially unrolled.

Figure 9A:
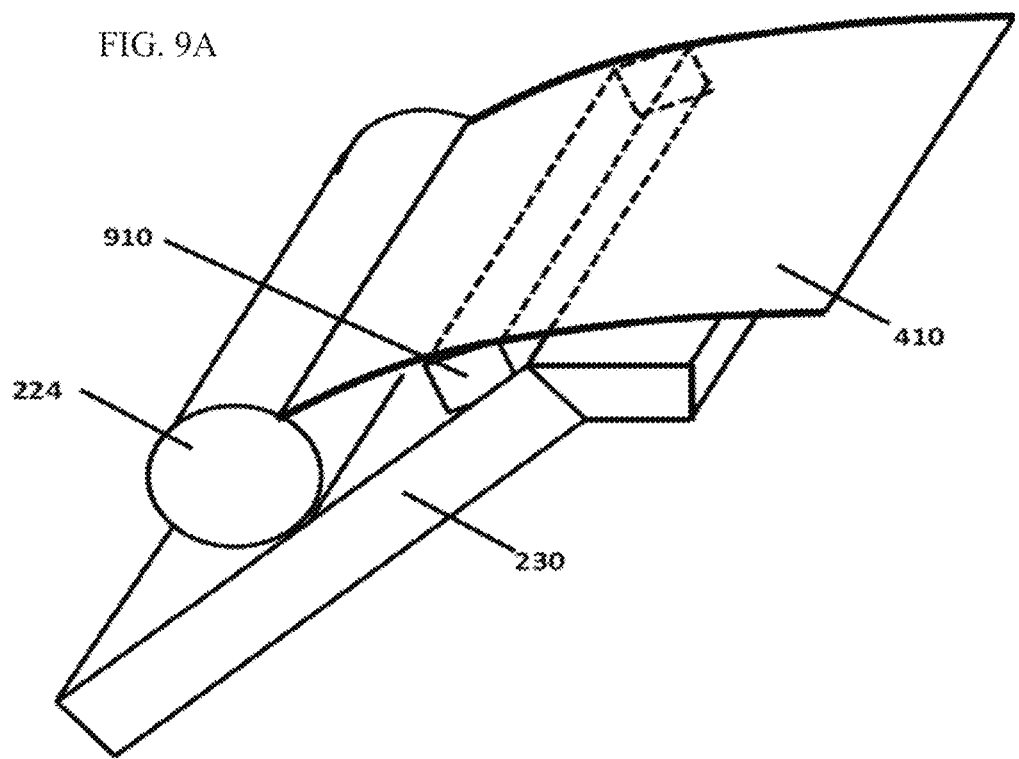
FIG. 9A and FIG. 9B illustrate a sealing member integrated into a flexible cover, according to embodiments of the present invention.

In some embodiments, as illustrated by way of example in FIG. 9A, a flexible, resilient sealing member 910 is integrated into the flexible cover 410 and extends parallel to the roller 224. The sealing member is located and configured to sealingly contact the (e.g., sloped) outer surface 230 of the frame when the arm is in the closed position. Due to the self-tensioning mechanisms as described above, the apparatus is configured so that, when in the open position, a consistent amount of the cover (e.g., all of the cover) is deployed from the roller regardless of the amount of heaping of the load. As such, the sealing member is consistently deployed into substantially the same location regardless of the amount of heaping of the load. The sealing member is located so that this consistent location is overtop of a side portion of the frame. The sealing member can be made of foam and seals the roller against the top rail of the trailer on the side where the flexible cover is not fixed. This inhibits bulk material such as light-weight chips from exiting the container during transport. In some embodiments, a closed cell or pocket may be provided in the flexible cover for housing the sealing member.

Figure 9B:
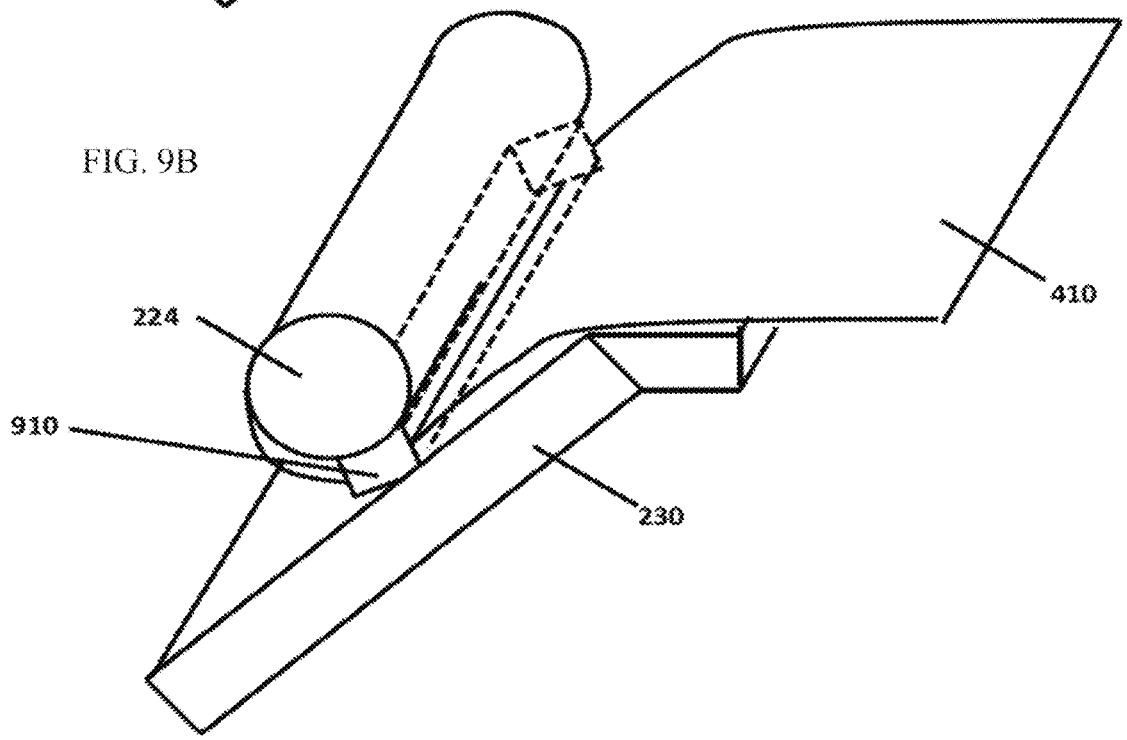

FIG. 9B illustrates another embodiment, in which the sealing member 910 is integrated into the flexible cover 410 at a location even more proximate to the roller 224, so that the sealing member 910 is sandwiched between the roller 224 and the outer surface 230 of the frame when the arm is in the closed position.

Figure 10A:
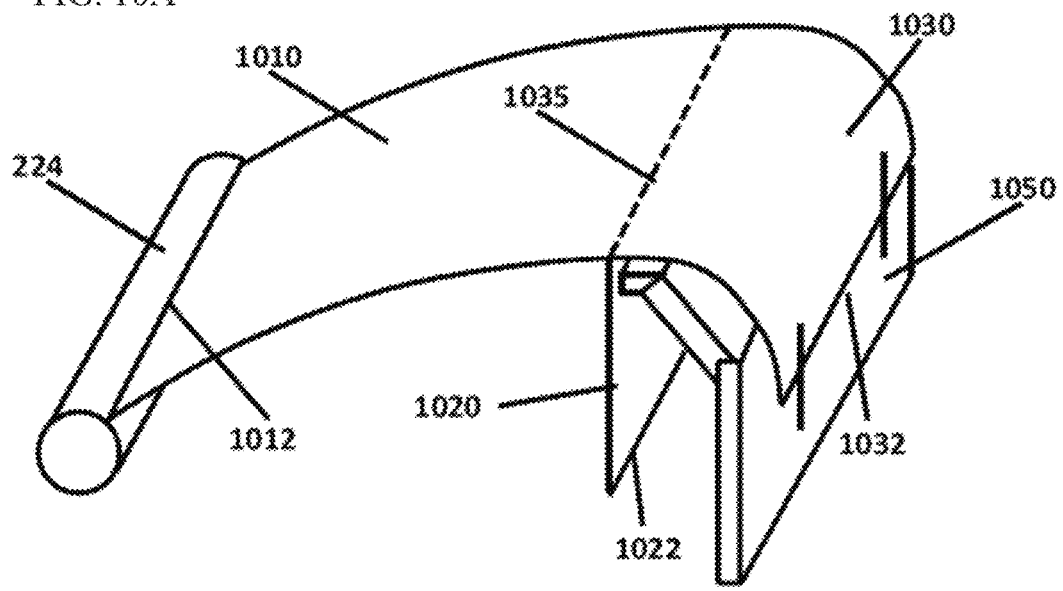
FIG. 10A and FIG. 10B illustrate a Y-shaped flexible cover, according to an embodiment of the present invention.
Figure 10B:
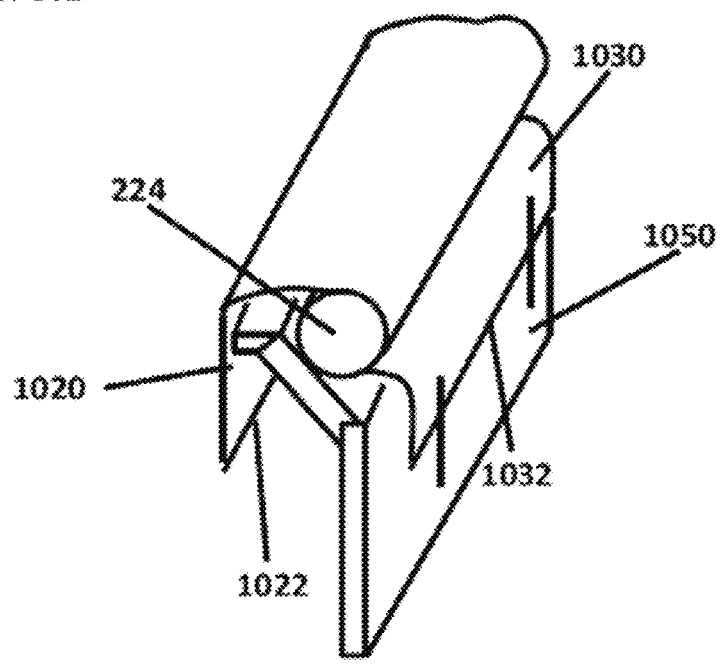

In some embodiments, and with reference by way of example to FIG. 10A and FIG. 10B, the flexible cover is Y-shaped, so that it includes three rectangular portions 1010, 1020, 1030 extending from a linear region 1035 that is parallel with axis of the roller 224. FIG. 10A illustrates the cover unrolled while FIG. 10B illustrates the cover taken up by the roller. Such a cover can be formed by attaching an edge of a second (e.g., rectangular) to an interior location of a first flexible cover. The first and second flexible covers may be attached along the linear region 1035. The Y-shaped cover includes three edges 1012, 1022, 1032 parallel to the roller axis. A first edge 1012 is attached to the take-up roller 240. A second edge 1022 is a hanging edge, with the second portion 1020 hanging downward into the interior of the container proximate to the container sidewall 1050. A third edge 1032 of the Y-shaped flexible cover is anchored to the exterior of the same container sidewall 1050. The sidewall 1050 is on the same side of the container as the arm and roller 224 when the arm is in the open position. The Y-shaped cover causes the second and third portions 1020, 1030 to envelop the container sidewall 1050, even when the arm is in the open position (FIG. 10B). This inhibits bulk material from getting caught between the flexible cover and trailer (frame), and also inhibits bulk material from being blown out during transport. Because of the inwardly and upwardly angled frame side portion, bulk material is otherwise susceptible to being caught in the "V" shaped region defined by the frame side portion and the roller plus rolled-up flexible cover. The second, hanging portion 1020 can be configured to have a sufficient weight to assist in causing the hanging orientation thereof, or it may be anchored to an interior of the sidewall 1050. Weights or attachment cables or elastic anchors can be added to the second portion 1020 as necessary. Transitioning from FIG. 10A to FIG. 10B comprises rotating the roller 224 clockwise. In the arrangement of FIG. 10B, if material lands on the narrow horizontal section of the cover, when the cover is returned to the closed position the material will be deposited into the container.

In some embodiments, the combination of covering and sealing features as described herein, such as the (recessed region) secondary cover and recessed region side flaps, the arm-actuated flexible cover (e.g., tarp), the sealing member integrated into the cover, and the Y-shaped cover, cooperate to substantially completely cover the top of the bulk material transportation container, and to seal the container to inhibit escape of bulk material.

In some embodiments, a manual actuation system is provided which can be used to move the arm between the open and closed position (to cover or uncover the container) in case of failure of the automatic system. The manual actuation system can include a hand crank system, a pulley system, etc. In one embodiment, resilient members anchoring the flexible cover (e.g., bungees) can be unhooked and the flexible cover can be wrapped up manually in in case of failure of the automatic system.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. An apparatus for covering an open top of a transportation trailer container, the apparatus comprising:
    an arm pivotable between a closed position and an open position, the arm holding a rotatable roller for dispensing and receiving a flexible cover, the flexible cover being wrapped around the roller when the arm is in the open position, the flexible cover being unrolled from the roller to cover the open top due to motion of the arm from the open position to the closed position, the arm pivotably mounted to an arm pivot;
    a recessed region comprising the arm pivot; and
    a secondary cover movable between a cover closed position and a cover open position, the secondary cover covering a top of the recessed region when in the cover closed position, the secondary cover biased toward the cover closed position, the secondary cover being overtop of the arm when the arm is in the closed position and the secondary cover is in the cover closed position.

2. The apparatus of claim 1, further comprising an actuating surface mechanically coupled to the arm, the actuating surface configured, when the arm moves from the closed position to the open position and the secondary cover is in the cover closed position, to contact and apply an outward force to the secondary cover, the outward force initiating movement of the secondary cover to the cover open position.

3. The apparatus of claim 1, further comprising an arm actuator pivotably coupled to the arm and configured to drive the arm between the closed position and the open position, the actuator arm pivotably mounted to an arm actuator pivot located in the recessed region, wherein the arm actuator is located inside the recessed region when the arm is in the closed position.

4. The apparatus of claim 1, wherein the secondary cover is biased to move from the cover open position to the cover closed position when the arm pivots to the open position.

5. The apparatus of claim 4, wherein the secondary cover is further biased to move from the cover open position to the cover closed position when the arm pivots to the closed position.

6. The apparatus of claim 4, the secondary cover also being overtop of the arm when the arm is in the open position and the secondary cover is in the cover closed position, the arm configured, when moving from the open position to the closed position and the secondary cover is in the cover closed position, to contact and apply a second outward force to the secondary cover, the second outward force initiating movement of the secondary cover to the cover open position.

7. The apparatus of claim 1, wherein a bottom of the recessed region comprises one or more openings communicating with the container and allowing bulk material falling into the recessed region to flow into the container.

8. The apparatus of claim 1, wherein one or more surfaces of the apparatus have at least a predetermined amount of slope, said predetermined amount of slope inhibiting accumulation of bulk material on said surfaces.

9. The apparatus of claim 1, wherein substantially all surfaces on a floor of the recessed region have at least a predetermined amount of slope, said predetermined amount of slope inhibiting accumulation of bulk material on said surfaces.

10. The apparatus of claim 1, further comprising a ramp located in the recessed region and a support roller coupled to the arm and disposed to roll along the ramp during motion of the arm, the ramp having a width narrower than a bulk material to be carried in the container, thereby inhibiting accumulation of the bulk material on the ramp.

11. The apparatus of claim 10, wherein the arm comprises a lower arm portion coupled to the arm pivot and an upper arm portion coupled to the roller, the lower arm portion and the upper arm portion relatively movable to provide a telescopically variable length of the arm, wherein the support roller is coupled to the upper arm portion and rests on the ramp, and wherein the ramp is located and shaped to vary length of the arm according to a predetermined profile as the arm pivots between the open position and the closed position.

12. The apparatus of claim 1, further comprising:
a ramp located in the recessed region and a support roller coupled to the arm and disposed to roll along the ramp during motion of the arm; and
a retention body located in the recessed region and overtop of the support roller when the arm is in the closed position, the retention body configured to inhibit upward motion of the support roller away from the ramp, thereby assisting retaining the arm in the closed position.

13. The apparatus of claim 1, wherein the frame is mounted to a top edge of the container such that a combined height of the transportation trailer container and the frame is less than or equal to a regulatory road height limit defined for road trailers.

14. The apparatus of claim 1, wherein a width of the transportation trailer including the apparatus when the arm is in the closed position is within a regulatory road width limit defined for road trailers.

15. The apparatus of claim 1, wherein substantially all top surfaces of the frame have at least a predetermined amount of slope, said predetermined amount of slope inhibiting accumulation of bulk material on said top surfaces.

16. The apparatus of claim 1, further comprising a flexible, resilient sealing member integrated into the flexible cover and extending parallel to the roller, the sealing member located and configured to sealingly contact the side portion when the arm is in the closed position.

17. The apparatus of claim 1, wherein the recessed region is located within a rectangular prism volume defined by extreme edges of the transportation trailer and intrudes into a volume of the container.

18. A road trailer for carrying bulk material and comprising the apparatus of claim 1.

* * * * *